(12) United States Patent
Kang et al.

(10) Patent No.: US 12,382,272 B2
(45) Date of Patent: Aug. 5, 2025

(54) METHOD AND APPARATUS FOR SUPPORTING ALLOCATION OF TRANSMISSION RESOURCE FOR SIDELINK RELAY DISCOVERY MESSAGE IN WIRELESS COMMUNICATION SYSTEM

(71) Applicant: SAMSUNG ELECTRONICS CO., LTD., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 17/656,411

(22) Filed: Mar. 24, 2022

(65) Prior Publication Data
US 2022/0322063 A1  Oct. 6, 2022

(30) Foreign Application Priority Data

| Mar. 25, 2021 | (KR) | 10-2021-0039065 |
| May 7, 2021 | (KR) | 10-2021-0059507 |
| Aug. 3, 2021 | (KR) | 10-2021-0102135 |
| Jan. 10, 2022 | (KR) | 10-2022-0003620 |

(51) Int. Cl.
*H04W 8/00* (2009.01)
*H04W 72/12* (2023.01)
*H04W 76/14* (2018.01)
*H04W 88/04* (2009.01)

(52) U.S. Cl.
CPC .......... *H04W 8/005* (2013.01); *H04W 72/12* (2013.01); *H04W 76/14* (2018.02); *H04W 88/04* (2013.01)

(58) Field of Classification Search
CPC ..... H04W 48/20; H04W 72/02; H04W 72/12; H04W 8/005; H04W 52/0219; H04W 52/028; H04W 52/563
USPC ......................................................... 370/315
See application file for complete search history.

(56) References Cited

U.S. PATENT DOCUMENTS

| 10,200,846 B2 | 2/2019 | Agiwal et al. |
| 11,877,240 B2 * | 1/2024 | Yang .................. H04W 52/028 |
| 2017/0353819 A1 | 12/2017 | Yin et al. |
| 2020/0100088 A1 | 3/2020 | Kim et al. |

(Continued)

FOREIGN PATENT DOCUMENTS

| EP | 3248426 A1 | 11/2017 |
| WO | 2016117940 A1 | 7/2016 |

OTHER PUBLICATIONS

International Search Report and Written Opinion of the International Searching Authority dated Jun. 23, 2022, in connection with International Application No. PCT/KR2022/004151, 9 pages.

(Continued)

*Primary Examiner* — William D Cumming

(57) ABSTRACT

Methods and apparatuses for a sidelink relay discovery message are provided in a wireless communication system. The method of user equipment (UE) comprises identifying a resource pool configured by a base station (BS), including at least one of a shared resource pool or a dedicated resource pool, determining a resource for the sidelink relay discovery message based on the identified resource pool and performing, based on the determined resource, transmission or reception of the sidelink relay discovery message.

16 Claims, 11 Drawing Sheets

(56) References Cited

U.S. PATENT DOCUMENTS

| | | | | |
|---|---|---|---|---|
| 2022/0225290 A1* | 7/2022 | Ganesan | ............... | H04W 72/02 |
| 2022/0248327 A1* | 8/2022 | Yang | ................ | H04W 52/0219 |
| 2022/0322063 A1* | 10/2022 | Kang | .................... | H04W 72/12 |
| 2023/0199803 A1* | 6/2023 | Kang | .................... | H04W 8/005 |
| | | | | 370/315 |
| 2023/0309009 A1* | 9/2023 | Back | ..................... | H04W 48/20 |
| 2023/0336962 A1* | 10/2023 | Chang | .................. | H04W 48/20 |
| 2024/0224237 A1* | 7/2024 | Ganesan | ............. | H04W 72/563 |

OTHER PUBLICATIONS

InterDigital Inc., "Discovery procedure for Sidelink relay," 3GPP RAN WG2 Meeting #113-e, R2-2100522, Electronic, Jan. 25-Feb. 5, 2021, 6 pages.

Apple, "Discussion on remaining issues on relay discovery," 3GPP RAN WG2 Meeting #113-e, R2-2100868, Online, Jan. 25-Feb. 5, 2020, 2 pages.

Intel Corporation, "On SL discovery for relaying," 3GPP RAN WG2 Meeting #113-e, R2-2100624, Electronic Meeting, Jan. 25-Feb. 5, 2021, 4 pages.

Supplementary European Search Report dated Sep. 24, 2024, in connection with European Patent Application No. 22776128.5, 11 pages.

CATT, "Miscellaneous Issus on Relay Discovery," R2-2100204, 3GPP TSG-RAN WG2 Meeting #113-e, Feb. 2021, 6 pages.

Samsung Electronics, "Sidelink relay discovery open issue," R2-2009173, 3GPP TSG-RAN WG2 Meeting #112-e, Nov. 2020, 2 pages.

* cited by examiner

METHOD AND APPARATUS FOR SUPPORTING ALLOCATION OF TRANSMISSION RESOURCE FOR SIDELINK RELAY DISCOVERY MESSAGE IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2021-0039065, filed on Mar. 25, 2021, 10-2021-0059507, filed on May 7, 2021, 10-2021-0102135, filed on Aug. 3, 2021, and 10-2022-0003620, filed on Jan. 10, 2022, in the Korean Intellectual Property Office, the disclosures of which are incorporated by reference herein in their entirety.

BACKGROUND

1. Field

The disclosure relates to a wireless communication system. More particularly, the disclosure relates to a method and apparatus for discovering a relay terminal capable of supporting direct communication when direct communication is performed between terminals based on a sidelink in a wireless communication system.

2. Description of the Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. For this reason, the 5G or pre-5G communication system is also called a beyond 4th-generation (4G) network communication system or post long-term evolution (LTE) system.

In order to achieve a high data rate, 5G communication systems are being developed to be implemented in a super-high frequency band (millimeter wave (mmWave)), e.g., a band of 60 GHz. To reduce path loss of radio waves and increase a transmission range of radio waves in the ultra-high frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device-to-device (D2D) communication, wireless backhaul, moving networks, cooperative communication, coordinated multi-points (CoMP), reception-end interference cancellation, and the like are also being developed in the 5G communication system.

In addition, in the 5G system, an advanced coding modulation (ACM) method, e.g., hybrid FSK and QAM modulation (FQAM), sliding window superposition coding (SWSC), and advanced access technology, e.g., filter bank multi carrier (FBMC), non-orthogonal multiple access (NOMA), and sparse code multiple access (SCMA) are being developed.

The 5G system considers supporting various services, compared to an existing 4G system. For example, the most representative services of the 5G system may include enhanced mobile broadband (eMBB) service, ultra-reliable and low-latency communication (URLLC) service, massive machine type communication (mMTC) service, and evolved multimedia broadcast/multicast service (eMBMS). A system providing the URLLC service may be referred to as a URLLC system, and a system providing the eMBB service may be referred to as an eMBB system. Also, the terms "service" and "system" may be interchangeably used.

Among the above services, the URLLC service is a service that is newly considered in the 5G system, unlike the existing 4G system, and the service satisfies conditions such as ultra-high reliability (e.g., an error rate of about 10' or less) and low latency (e.g., a latency time of about 0.5 msec or less), compared to other services. In order to satisfy these strict conditions, the URLLC service may need application of a transmission time interval (TTI) shorter than that of the eMBB service, and various operation methods utilizing the same are under consideration.

Meanwhile, the Internet is evolving from a human-oriented connectivity network where humans generate and consume information to an Internet of things (IoT) network where distributed entities or things transmit, receive and process information without human intervention. Internet of everything (IoE) technology in which a big data processing technology through a connection with a cloud server or the like is combined with the IoT technology has emerged. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied.

In an IoT environment, intelligent Internet technology (IT) services may be provided to collect and analyze data obtained from objects connected to each other to create new value in human life. The IoT may be applied to fields such as smart homes, smart buildings, smart cities, smart cars or connected cars, smart grids, health care, smart home appliances, and advanced medical services through convergence and integration of existing IT and various industries.

In this regard, various attempts to apply the 5G communication system to the IoT network are being made. For example, technologies such as sensor network, M2M communication, and MTC are implemented by 5G communication technologies such as beamforming, MIMO, and array antenna. The application of a cloud RAN as big data processing technology may also be considered as an example of convergence between 5G technology and IoT technology.

Also, direct communication between terminals using the 5G communication system, e.g., sidelink communication, is being studied, and the communication between terminals, e.g., vehicle-to-everything (V2X), is applied to public safety networks and is expected to provide various services to users.

SUMMARY

In direct communication between terminals using sidelink communication, there is a demand for a method of utilizing a sidelink relay capable of supporting an extension of service coverage, an increase in data transmission reliability, and a reduction in power consumption of a terminal. The disclosure provides a method and apparatus for allocating a resource on which a relay discovery message used in a sidelink relay discovery procedure is transmitted, in order to support a terminal performing sidelink-based data transmission/reception in a wireless communication system.

The technical problems to be achieved in the disclosure are not limited to the aforementioned technical problems, and other technical problems not mentioned may be clearly understood by one of ordinary skill in the art based on the descriptions below.

Additional aspects will be set forth in part in the description which follows and, in part, will be apparent from the description, or may be learned by practice of the presented embodiments of the disclosure.

In an embodiment of the present disclosure, a method, performed by a user equipment (UE) for a sidelink relay discovery message in a wireless communication system, comprises identifying a resource pool configured by a base station (BS), wherein the resource pool includes at least one of a shared resource pool or a dedicated resource pool, determining a resource for the sidelink relay discovery message based on the identified resource pool and performing, based on the determined resource, transmission or reception of the sidelink relay discovery message.

In another embodiment of the present disclosure, a user equipment (UE) in a wireless communication system, comprises a transceiver, memory, and a processor operably coupled with the transceiver and the memory, the processor configured to identify a resource pool configured by a base station (BS), wherein the resource pool includes at least one of a shared resource pool or a dedicated resource pool, determine a resource for the sidelink relay discovery message based on the identified resource pool; and perform, based on the determined resource, transmission or reception of the sidelink relay discovery message.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
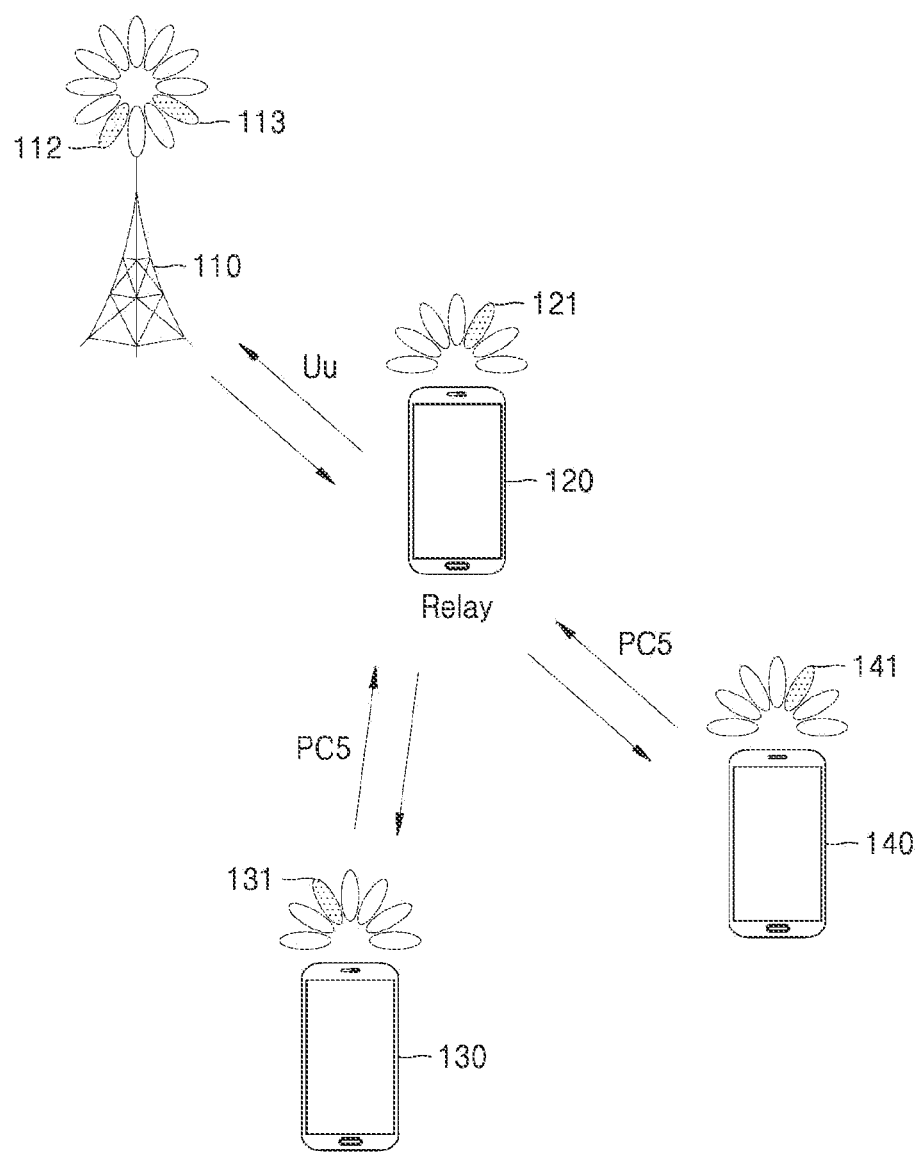
FIG. 1A is a diagram illustrating a wireless communication system according to an embodiment of the disclosure.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, exemplary embodiments of the disclosure will be described in detail with reference to accompanying drawings. In the accompanying drawings, it will be understood that like reference numerals denote like components. Also, detailed descriptions of well-known functions and configurations in the art are omitted when it is deemed that they may obscure the gist of the disclosure.

In the following descriptions of embodiments in the specification, descriptions of techniques that are well known in the art and are not directly related to the disclosure may be omitted. This is intended to prevent the unnecessary descriptions from obscuring the subject matters of the disclosure and to further clearly describe the gist of the disclosure.

For the same reasons, components may be exaggerated, omitted, or schematically shown in drawings for clarity. Also, the size of each component does not entirely reflect the actual size, and each component is not limited to that illustrated in the drawings. In each drawing, components that are the same or are in correspondence are rendered the same reference numeral.

Advantages and features of the disclosure and methods of accomplishing the same may be understood more readily by reference to the following detailed description of the embodiments of the disclosure and the accompanying drawings. However, the disclosure may be embodied in various different forms and should not be construed as being limited to the embodiments set forth herein. The embodiments of the disclosure are provided so that the disclosure will be thorough and complete, and will fully convey the scope of the disclosure to those of ordinary skill in the art. The disclosure may be defined by the appended claims. In the specification, the same components are denoted by the same reference numerals.

In various embodiments, it will be understood that combinations of blocks in flowcharts or process flow diagrams may be performed by computer program instructions. Because these computer program instructions may be loaded into a processor of a general-purpose computer, a special purpose computer, or other programmable data processing equipment, the instructions, which are executed through the processor of the computer or other programmable data processing equipment, may generate means for implementing functions specified in the flowchart block(s). These computer program instructions may also be stored in a computer-executable or computer-readable memory that may direct the computer or other programmable data processing equipment to function in a particular manner. The instructions stored in the computer-executable or computer-readable memory may produce an article of manufacture including instruction means for implementing the functions specified in the flowchart block(s). The computer program instructions may also be loaded onto the computer or other programmable data processing equipment. A series of operational steps may be performed on the computer or other programmable equipment to produce a computer implemented process, and thus the instructions executed on the computer or other programmable equipment may provide steps for implementing the functions specified in the flowchart block(s).

In addition, each block of the flowchart illustrations may represent a module, segment, or portion of code, which includes one or more executable instructions for implementing specified logical function(s). It should also be noted that in some alternative implementations, the functions noted in the blocks may occur out of the order. For example, two blocks shown successively may actually be executed substantially concurrently, or the blocks may sometimes be performed in a reverse order according to the corresponding function.

In this regard, the term " . . . er/or" or "module" used herein refers to a software or hardware component, such as field programmable gate array (FPGA) or application specific integrated circuit (ASIC) which plays a certain role. However, the term " . . . er/or" or "module" is not limited to software or hardware. The term " . . . er/or" or "module" may be configured in an addressable storage medium or may be configured to reproduce one or more processors. Thus, for example, the term " . . . ers/ors" or "modules" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and " . . . ers/ors" or "modules" may be combined into fewer components and " . . . ers/ors" or "modules" may be further separated into additional components and " . . . ers/ors" or "modules." Further, the components and " . . . ers/ors" or "modules" may be implemented to operate one or more central processing units (CPUs) in a device or a secure multimedia card.

When particularly describing embodiments of the disclosure, a new radio access network (RAN) (NR) that is a radio access network and a packet core (5G system, 5G core network, or next generation (NG) core) that is a core network in 5G mobile communication standards defined by $3^{rd}$ generation partnership project (3GPP) that is a mobile communication standard organization group may be main targets. The essential concept of the disclosure may be modified without departing from the scope of the disclosure and may be applied to other communication systems based on similar technical backgrounds, and the application may be made based on determination by one of ordinary skill in the art.

In the 5G system, a network data collection and analysis function (NWDAF) may be defined to support network automation, the NWDAF referring to a network function for providing a function to analyze and provide data collected over a 5G network. The NWDAF may collect/store/analyze information from the 5G network and may provide a result to an unspecified network function (NF), and an analysis result may be independently used by each NF.

For convenience of descriptions, the disclosure uses some of terms and names defined in the 3GPP long-term evolution (LTE) standards (standards of 5G, NR, LTE, or similar systems). However, the disclosure is not limited to these terms and names, and may be equally applied to communication systems conforming to other standards.

Hereinafter, the disclosure relates to a method and apparatus for processing allocation of a resource for transmission of a sidelink (SL) relay discovery message when direct data transmission/reception is performed between UEs or when data transmission/reception is performed between a UE and a base station (BS), by using an SL relay UE in a wireless communication system.

In detail, the disclosure provides a method of processing allocation information about an SL transmission resource on which a SL relay UE or an SL remote UE is to transmit an SL relay discovery message. The above method may be applied when the relay UE or the remote UE receives allocation from the BS or when the relay UE or the remote UE performs direct selection. An operation of receiving allocation of an SL transmission resource for transmission of the SL relay discovery message from the BS may include operations of transmitting, by the relay UE or the remote UE, a request for allocation of the SL transmission resource to the BS, and receiving the allocation of the SL transmission resource from the BS. The operation of receiving the allocation of the SL transmission resource for transmission of the SL relay discovery message from the BS may include an operation of receiving, by the relay UE or the remote UE, allocation of a periodic transmission resource or a semi-persistent transmission resource from the BS.

According to an embodiment of the disclosure, data or signaling transmitted by using an SL separately from the SL relay discovery message may include at least one of PC5-S signaling (e.g., direct link establishment request, direct link establishment accept, direct security mode command, direct security mode complete, direct link release request, and direct link release accept), a PC5-radio resource control (RRC) message (e.g., RRC reconfiguration SL, RRC reconfiguration complete SL, UE capability enquiry SL, and UE capability information SL), or a PC5 user packet (user traffic information), which is transmitted through an SL common control channel (SCCH) introduced to support an NR-vehicle-to-everything (V2X) function. The SL relay discovery message may be transmitted through a separate SL signaling bearer, a separate logical channel (LCH), or a separate LCH group, unlike other SL data or other SL signaling. The SL relay discovery message may be transmitted on a resource selected from a separate SL resource pool, unlike other SL data or other SL signaling. The SL relay discovery message may be indicated in separate SL control indication information (SCI), unlike other SL data or other SL signaling. According to embodiments of the disclosure, by allowing a UE to discover an SL relay, service coverage may be extended, data transmission/reception reliability may be increased, and battery usage of the UE may be reduced.

Also, in detail, according to an embodiment of the disclosure, a method of processing configuration information in which a UE transmits or receives an SL relay discovery message in a wireless communication system may include: obtaining configuration information about a gap in which the UE transmits the SL relay discovery message; obtaining configuration information about a gap in which the UE receives the SL relay discovery message; and obtaining configuration information about an SL configured grant for receiving allocation of a transmission resource, on which the UE transmits the SL relay discovery message, in a periodic or semi-persistent manner.

Hereinafter, terms indicating signals, terms indicating channels, terms indicating control information, terms indicating network entities, terms indicating components of apparatuses, and the like, as used in the following description, are exemplified for convenience of descriptions. Accordingly, the disclosure is not limited to the terms, and other terms indicating objects having equivalent technical meanings may be used.

Hereinafter, a BS refers to an entity for allocating a resource to a UE and may be interchangeably used with at least one of a next-generation node B (gNode B), an evolved node B (eNode B), a node B, a BS, a radio access unit, a BS controller, or a node over a network. Examples of a terminal may include a UE, an MS, a cellular phone, a smartphone, a computer, a multimedia system capable of performing a communication function, or the like. However, these are only examples, and the BS and the UE are not limited to the above examples. In the disclosure, an eNode B (eNB) may be interchangeably used with a gNode B (gNB) for convenience of descriptions. That is, a BS described by an eNB may represent a gNB. In the disclosure, the term "terminal" may refer to various wireless communication devices as well as mobile phones, NB-IoT devices, and sensors.

In the following descriptions, a physical channel and signal may be interchangeably used with data or a control signal. For example, a physical downlink shared channel (PDSCH) is a term indicating a physical channel through which data is transmitted, but the PDSCH may also be used to indicate data. That is, in the disclosure, the expression "transmitting a physical channel" may be equivalently interpreted to the expression "transmitting data or a signal through a physical channel."

Hereinafter, in the disclosure, higher layer signaling refers to a method of transmitting a signal from the BS to the UE by using a downlink (DL) data channel of a physical layer or transmitting a signal from the UE to the BS by using an uplink (UL) data channel of a physical layer. The higher layer signaling may be understood as RRC signaling or a media access control (MAC) control element (CE).

Also, in the disclosure, the expressions such as "greater than" or "less than" are used to determine whether a particular condition is satisfied or fulfilled, but the expressions are only used to express examples and may not exclude meaning of "greater than or equal to" or "less than or equal to." A condition written with "greater than or equal to" may be replaced with "greater than," a condition with "less than or equal to" may be replaced with "less than," and a condition with "greater than or equal to . . . and less than . . . " may be replaced with "greater than . . . and less than or equal to . . . ."

Also, in the disclosure, various embodiments will be described by using terms and names defined in some communication standards (e.g., the 3GPP), but the embodiments are only examples for description. Embodiments of the disclosure may be easily modified and applied to other communication systems.

FIG. 1A is a diagram illustrating a wireless communication system according to an embodiment of the disclosure.

FIG. 1A illustrates a BS 110, UEs 130 and 140, and an SL relay 120 capable of relaying data transmission/reception between a BS and a UE, as parts of nodes using a radio channel in the wireless communication system. In this case, the SL relay 120 corresponds to a UE-to-network (U2N) relay. Although FIG. 1A illustrates only one BS, another BS same as similar to the BS 110 may be further present.

The BS 110 refers to a network infrastructure providing a radio access to the UEs 130 and 140 and the relay 120. The BS 110 has coverage defined as a certain geographical area based on a range for transmitting a signal. The BS 110 may also be referred to as, in addition to the BS, an "access point (AP)," an "eNB," a "5G node," a "gNB," a "wireless point," a "transmission/reception point (TRP)," or another term having an equivalent technical meaning.

The relay 120 may be an apparatus used by a user or a network infrastructure and may communicate with the BS 110 through a radio channel. A link from the BS 110 to the relay 120 may be referred to as a DL, and a link from the relay 120 to the BS 110 may be referred to as a UL. The BS 110 and the relay 120 may be connected to each other through a Uu interface. The UL refers to a radio link through which the relay 120 transmits data or a control signal to the BS 110, and the DL refers to a radio link through which the BS 110 transmits data or a control signal to the relay 120.

The relay 120 may communicate with a first UE 130 and a second UE 140 through a radio channel. In this regard, a link between the relay 120 and the first UE 130 and a link between the relay 120 and the second UE 140 may each be referred to as an SL, and the SL may also be referred to as a PC5 interface.

Each of the UEs 130 and 140 may be an apparatus used by a user, and may communicate with the BS 110 through a radio channel or may communicate with a network through a radio channel with the relay 120 through a radio channel. In the disclosure, a case where each of the first UE 130 and the second UE 140 performs communicate through the radio channel with the relay 120 may be considered. At least one of the first UE 130 or the second UE 140 may operate without a user's involvement. That is, at least one of the first UE 130 or the second UE 140 may be an apparatus performing MTC and may not be carried by a user. Each of the first UE 130 and the second UE 140 may be referred to as, in addition to the terminal, a "UE," an "MS," a "subscriber station," a "remote terminal," a "wireless terminal," a "user device," or another term having an equivalent technical meaning.

Figure 1B:
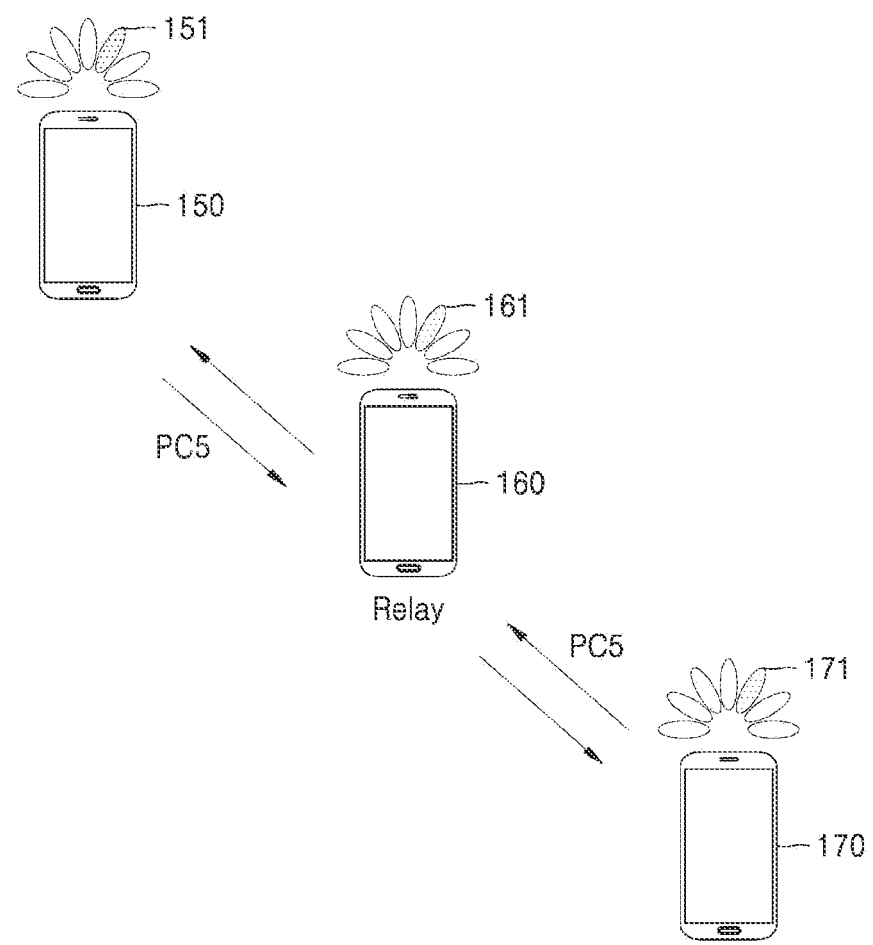
FIG. 1B is a diagram illustrating a wireless communication system according to another embodiment of the disclosure.

FIG. 1B is a diagram illustrating a wireless communication system according to another embodiment of the disclosure.

FIG. 1B illustrates a wireless communication system including UEs 150 and 170, and an SL relay 160 capable of relaying data transmission/reception between a UE and a UE, as parts of nodes using a radio channel in the wireless communication system. In this case, the SL relay 160 corresponds to a U2U relay.

The relay 160 may communicate with a third UE 150 and a fourth UE 170 through a radio channel. In this regard, a link between the relay 160 and the third UE 150 and a link between the relay 160 and the fourth UE 170 may each be referred to as an SL, and the SL may also be referred to as a PC5 interface.

Each of the third UE 150 and the fourth UE 170 is an apparatus used by a user, and may directly communicate with each other through a radio channel or may communicate with a counterpart UE through a radio channel with the relay 160. In this regard, a link between the third UE 150 and the fourth UE 170 and a link between the third UE 150 and the relay 160, and a link between the fourth UE 170 and the relay 160 may each be referred to as an SL, and the SL may be referred to as a PC5 interface.

At least one of the third UE 150 or the fourth UE 170 may operate without a user's involvement. That is, at least one of the third UE 150 or the fourth UE 170 may be an apparatus performing MTC and may not be carried by a user. Each of the third UE 150 and the fourth UE 170 may be referred to as, in addition to the terminal, a "UE," an "MS," a "subscriber station," a "remote terminal," a "wireless terminal," a "user device," or another term having an equivalent technical meaning.

In the following descriptions, a UL or a DL, a Uu interface, an SL, and PC5 may be interchangeably used.

The BS 110, the relays 120 and 160, and the UEs 130, 140, 150, and 170, shown in FIGS. 1A and 1B, may transmit and receive wireless signals in millimeter wave (mmWave) bands (e.g., 28 GHz, 30 GHz, 38 GHz, and 60 GHz). In this regard, in order to improve a channel gain, the BS 110, the relays 120 and 160, and the UEs 130, 140, 150, and 170 may perform beamforming. In this case, the beamforming may include transmission beamforming and reception beamforming. That is, the BS 110, the relays 120 and 160, and the UEs 130, 140, 150, and 170 may assign directivity to a transmission signal or a reception signal. For this purpose, the BS 110, the relays 120 and 160, and the UEs 130, 140, 150, and 170 may select serving beams 112, 113, 121, 131, 141, 151, 161, and 171 through a beam search or beam management procedure. After the serving beams 112, 113, 121, 131, 141, 151, 161, and 171 are selected, communication may be performed on resource having a quasi-co-located (QCL) relationship with a resource that transmitted the serving beams 112, 113, 121, 131, 141, 151, 161, and 171.

It may be evaluated that a first antenna port and a second antenna port are in a QCL relationship when large-scale characteristics of a channel through which a symbol on the first antenna port is transmitted are able to be inferred from a channel through which a symbol on the second antenna port is transmitted. For example, the large-scale characteristics may include at least one of a delay spread, a Doppler spread, a Doppler shift, an average gain, an average delay, or a spatial receiver parameter.

The first UE 130, the second UE 140, the third UE 150, and the fourth UE 170, shown in FIGS. 1A and 1B, may support vehicle communication. In the case of vehicle communication, in the LTE system, standardization for V2X technology based on a device-to-device (D2D) structure has been completed in the 3GPP Releases 14 and 15, and standardization for V2X technology based on 5G NR has been completed in the 3GPP Release 16. In NR V2X, unicast communication, groupcast (or multicast) communication, and broadcast communication between UEs may be supported. Also, unlike LTE V2X aimed for transmission and reception of basic safety information for driving of vehicles on roads, the NR V2X aims to provide further advanced services such as platooning, advanced driving, extended sensor, remote driving, and the like. A V2X service may be divided into a basic safety service and an advanced service. The basic safety service may include detailed services such as a cooperative awareness message (CAM) or basic safety message (BSM) service, a left-turn notification service, a vehicle forward collision warning service, an emergency vehicle approach notification service, a front obstacle warning service, an intersection signal information service, and the like.

Also, in the basic safety service, V2X information may be transmitted/received by using a broadcast, unicast, or groupcast transmission method. In the advanced service, quality of service (QoS) requirements may be strengthened than in the basic safety service. In the advanced service, there may be a need for a method of transmitting/receiving V2X information by using the unicast and groupcast transmission methods, other than the broadcast transmission method, so that V2X information may be transmitted/received within a particular vehicle group or V2X information may be transmitted/received between two vehicles. The advanced service may include detailed services such as a platooning service, an autonomous driving service, a remote driving service, an extended sensor-based V2X service, and the like. Also, the NR V2X may provide a public safety service by supporting a direct communication service between UEs in an area where there is no network infrastructure.

Hereinafter, the SL refers to a transmission/reception path for a signal between UEs or a transmission/reception path for a signal between a UE and a relay, and the SL may be interchangeably used with a PC5 interface. Hereinafter, the BS refers to an entity for allocating a resource to a UE and a relay and may be a BS supporting both V2X communication and general cellular communication, or a BS supporting only V2X communication. That is, the BS may refer to an NR BS (e.g., a gNB), an LTE BS (e.g., an eNB), or a road site unit (RSU). The UE may include all of a general UE, an MS, a vehicle supporting vehicle-to-vehicle (V2V) communication, a vehicle or a pedestrian's handset (e.g., a smartphone) supporting a vehicle-to-pedestrian (V2P) communication, a vehicle supporting vehicle-to-network (V2N) communication, a vehicle supporting vehicle-to-infrastructure (V2I) communication, an RSU having embedded therein UE functions, an RSU having embedded therein BS functions, or an RSU having embedded therein some BS functions and some UE functions.

Meanwhile, in the disclosure, the UE may refer to the vehicle supporting V2V communication, the vehicle or the pedestrian's handset (e.g., a smartphone) supporting V2P communication, the vehicle supporting V2N communication, or the vehicle supporting V2I communication. The UE may refer to a user device supporting communication between devices of a public safety net.

Also, in the disclosure, the UE may refer to the RSU having embedded therein UE functions, the RSU having embedded therein BS functions, or the RSU having embedded therein some BS functions and some UE functions.

In the disclosure, the relay may refer to a vehicle supporting V2X communication or a user device supporting communication between devices of a public safety net. In addition, in the disclosure, the relay may refer to an apparatus having embedded therein UE functions, an apparatus having embedded therein BS functions, or an apparatus having embedded therein some UE functions or some BS functions.

Figure 2:
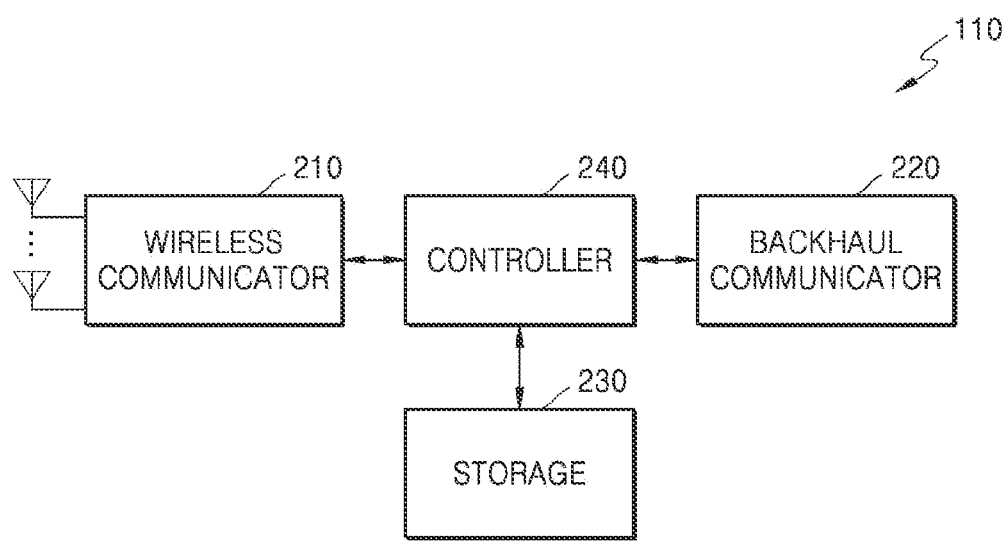
FIG. 2 illustrates a block diagram of a configuration of a base station in a wireless communication system according to an embodiment of the disclosure.

FIG. 2 illustrates a block diagram of a configuration of a BS in a wireless communication system, according to an embodiment of the disclosure.

The configuration shown in FIG. 2 may be understood as a configuration of the BS 110. The term " . . . er/or" or "module" used below indicates a unit, which processes at least one function or operation, and may be implemented by hardware or software, or by a combination of hardware and software.

Referring to FIG. 2, the BS 110 may include a wireless communicator 210, a backhaul communicator 220, a storage 230, and a controller 240. However, components of the BS 110 are not limited to the aforementioned example. For example, the BS may include more components than those described above or may include fewer components than those described above. In addition, the wireless communicator 210, the backhaul communicator 220, the storage 230, and the controller 240 may be implemented in a single chip. Also, the controller 240 may include one or more processors.

The wireless communicator 210 may perform functions for transmitting/receiving a signal through a radio channel. For example, the wireless communicator 210 may perform conversion between a baseband signal and a bit string based on physical layer specifications of a system. For example, for data transmission, the wireless communicator 210 may generate complex symbols by encoding and modulating a transmission bit string. Also, for data reception, the wireless communicator 210 may reconstruct a reception bit string by demodulating and decoding a baseband signal.

In addition, the wireless communicator 210 may up-convert a baseband signal into a radio frequency (RF) band signal and then may transmit the RF band signal through an antenna, and may down-convert an RF band signal received through the antenna, into a baseband signal. For this purpose, the wireless communicator 210 may include a transmission filter, a reception filter, an amplifier, a mixer, an oscillator, a digital-to-analog converter (DAC), an analog-to-digital converter (ADC), or the like. Also, the wireless communicator 210 may include a plurality of transmission/reception paths. Furthermore, the wireless communicator 210 may include at least one antenna array including a plurality of antenna elements.

In terms of hardware, the wireless communicator 210 may be configured as a digital unit and an analog unit, and the analog unit may be configured as a plurality of sub-units depending on operation power, an operation frequency, or the like. The digital unit may be configured as at least one processor (e.g., a digital signal processor (DSP)).

The wireless communicator 210 may transmit and receive signals as described above. Accordingly, all parts or some parts of the wireless communicator 210 may be referred to as a "transmitter," a "receiver," or a "transceiver." Also, in the following descriptions, transmission and reception performed through a radio channel may be used in the meaning that the aforementioned processing is performed by the wireless communicator 210.

The backhaul communicator 220 may provide an interface for communicating with other nodes in a network. That is, the backhaul communicator 220 may convert a bit string into a physical signal, the bit string being transmitted from the BS 110 to another node, e.g., another access node, another BS, a higher node, a core network, and the like, and may convert a physical signal into a bit string, the physical signal being received from another node.

The storage 230 may store data, such as basic programs, application programs, and configuration information, for operations of the BS 110. The storage 230 may be configured as a volatile memory, a non-volatile memory, or a combination of a volatile memory and a non-volatile memory. In addition, the storage 230 may provide the stored data upon a request by the controller 240.

The controller 240 may control overall operations of the BS 110. For example, the controller 240 may transmit and receive signals through the wireless communicator 210 or the backhaul communicator 220. Also, the controller 240 writes and reads data to and from the storage 230. In addition, the controller 240 may perform functions of a protocol stack required by the communication standard. According to another embodiment of the disclosure, the protocol stack may be included in the wireless communicator 210. For this purpose, the controller 240 may include at least one processor. According to embodiments of the disclosure, the controller 240 may control the BS 110 to perform operations according to embodiments to be described below.

Figure 3:
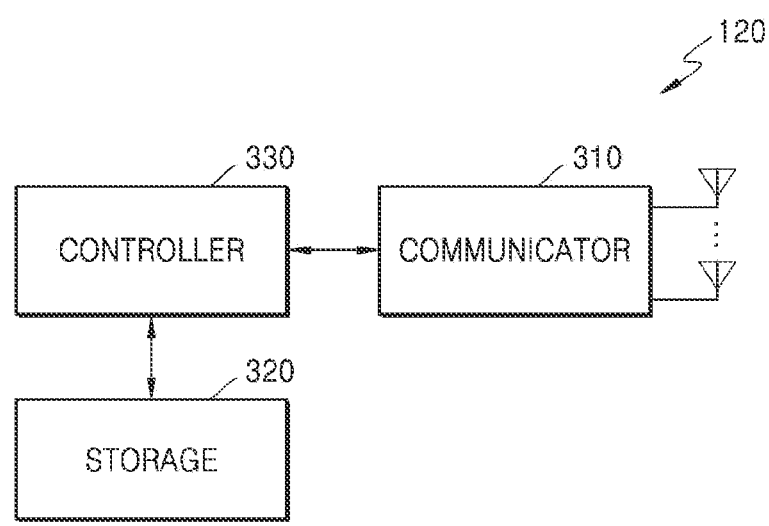
FIG. 3 illustrates a block diagram of a configuration of a terminal in a wireless communication system according to an embodiment of the disclosure.

FIG. 3 illustrates a block diagram of a configuration of a UE in a wireless communication system, according to an embodiment of the disclosure.

The configuration shown in FIG. 3 may be understood as a configuration of a UE 120. The term " . . . er/or" or "module" used below indicates a unit, which processes at least one function or operation, and may be implemented by hardware or software, or by a combination of hardware and software.

Referring to FIG. 3, the UE 120 may include a communicator 310, a storage 320, and a controller 330. However, components of the UE 120 are not limited to the aforementioned example. For example, the UE 120 may include more components than those described above or may include fewer components than those described above. In addition, the communicator 310, the storage 320, and the controller 330 may be implemented in a single chip. Also, the controller 330 may include one or more processors.

The communicator 310 performs functions for transmitting/receiving a signal through a radio channel. For example, the communicator 310 may perform conversion between a baseband signal and a bit string based on physical layer specifications of a system. For example, for data transmission, the communicator 310 generates complex symbols by encoding and modulating a transmission bit string. Also, for data reception, the communicator 310 may reconstruct a reception bit string by demodulating and decoding a baseband signal. In addition, the communicator 310 may up-convert a baseband signal into an RF band signal and then may transmit the RF band signal through an antenna, and may down-convert an RF band signal received through the antenna, into a baseband signal. For example, the communicator 310 may include a transmission filter, a reception filter, an amplifier, a mixer, an oscillator, a DAC, an ADC, or the like.

Also, the communicator 310 may include a plurality of transmission/reception paths. Furthermore, the communicator 310 may include at least one antenna array including a plurality of antenna elements. In terms of hardware, the communicator 310 may be configured as a digital circuit and an analog circuit (e.g., a radio frequency integrated circuit (RFIC)). In this case, the digital circuit and the analog circuit may be implemented in a single package. Also, the communicator 310 may include a plurality of RF chains. Furthermore, the communicator 310 may perform beamforming.

The communicator 310 may transmit and receive signals as described above. Accordingly, all parts or some parts of the communicator 310 may be referred to as a "transmitter," a "receiver," or a "transceiver." Also, in the following descriptions, transmission and reception performed through a radio channel may be used in the meaning that the aforementioned processing is performed by the communicator 310.

The storage 320 may store data, such as basic programs, application programs, or configuration information, for operations of the UE 120. The storage 320 may be configured as a volatile memory, a non-volatile memory, or a combination of a volatile memory and a non-volatile memory. In addition, the storage 320 provides the stored data upon a request by the controller 330.

The controller 330 controls overall operations of the UE 120. For example, the controller 330 may transmit and receive signals through the communicator 310. Also, the controller 330 writes and reads data to and from the storage 320. In addition, controller 330 may perform functions of a protocol stack required by the communication standard. For this purpose, the controller 330 may include at least one processor or microprocessor or may be a part of a processor. Also, a part of the communicator 310 and the communicator 310 may be referred to as a communication processor (CP). According to embodiments of the disclosure, the controller 330 may control the UE 120 to perform operations according to embodiments to be described below.

Figure 4:
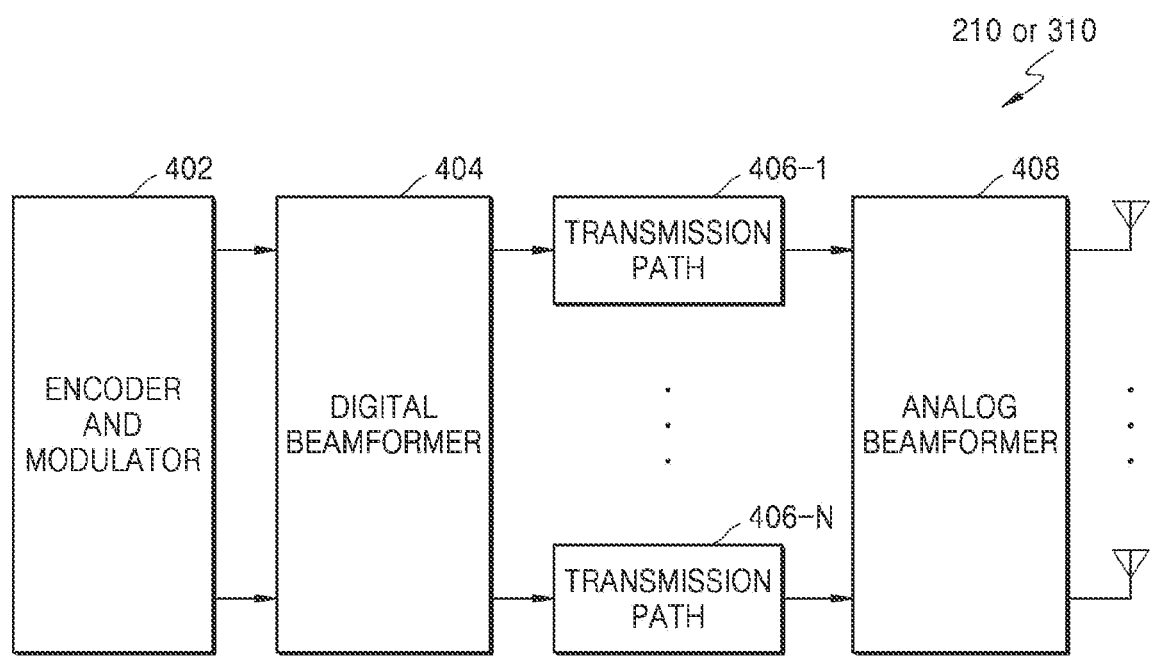
FIG. 4 illustrates a block diagram of a configuration of a communicator in a wireless communication system according to an embodiment of the disclosure.

FIG. 4 illustrates a block diagram of a configuration of a communicator in a wireless communication system according to an embodiment of the disclosure.

FIG. 4 illustrates an example of a detailed configuration of the wireless communicator 210 of FIG. 2 or the communicator 310 of FIG. 3. In detail, FIG. 4 illustrates components for performing beamforming, as a part of the wireless communicator 210 of FIG. 2 or the communicator 310 of FIG. 3.

Referring to FIG. 4, the wireless communicator 210 or the communicator 310 may include an encoder and modulator 402, a digital beamformer 404, a plurality of transmission paths 406-1 to 406-N, and an analog beamformer 408.

The encoder and modulator 402 may perform channel encoding. For the channel encoding, at least one of a low density parity check (LDPC) code, a convolution code, or a polar code may be used. The encoder and modulator 402 generates modulation symbols by performing constellation mapping.

The digital beamformer 404 may perform beamforming on a digital signal (e.g., modulated symbols). For this purpose, the digital beamformer 404 may multiply the modulated symbols by beamforming weights. In this case, the beamforming weights are used to change a magnitude and a phase of a signal, and may be referred to as a "precoding matrix," a "precoder," or the like. The digital beamformer 404 may output modulated symbols that are digitally-beamformed by the plurality of transmission paths 406-1 to 406-N. In this regard, according to an MIMO transmission technique, the modulated symbols may be multiplexed or the same modulated symbols may be provided to the plurality of transmission paths 406-1 to 406-N.

The plurality of transmission paths 406-1 to 406-N may convert the digitally-beamformed digital signals into analog signals. For this purpose, each of the plurality of transmission paths 406-1 to 406-N may include an inverse fast Fourier transform (IFFT) operator, a cyclic prefix (CP) inserter, a DAC, and an up-converter. The CP inserter is provided for an orthogonal frequency division multiplexing (OFDM) scheme and may be excluded when a different physical layer scheme (e.g., filter bank multi-carrier (FBMC)) is applied. That is, the plurality of transmission paths 406-1 to 406-N may provide independent signal processing processes to a plurality of streams generated through digital beamforming. However, depending on implementation methods, some components of the plurality of transmission paths 406-1 to 406-N may be commonly used.

The analog beamformer 408 may perform beamforming on analog signals. For this purpose, the digital beamformer 404 may multiply the analog signals by beamforming weights. In this regard, the beamforming weights are used to change a magnitude and a phase of a signal. In detail, the analog beamformer 408 may be variously configured, based on connection structures between the plurality of transmission paths 406-1 to 406-N and antennas. For example, each of the plurality of transmission paths 406-1 to 406-N may be connected to one antenna array. As another example, each of the plurality of transmission paths 406-1 to 406-N may be connected to one antenna array. Also, as another example, the plurality of transmission paths 406-1 to 406-N may be adaptively connected to one antenna array or at least two antenna arrays.

Figure 5:
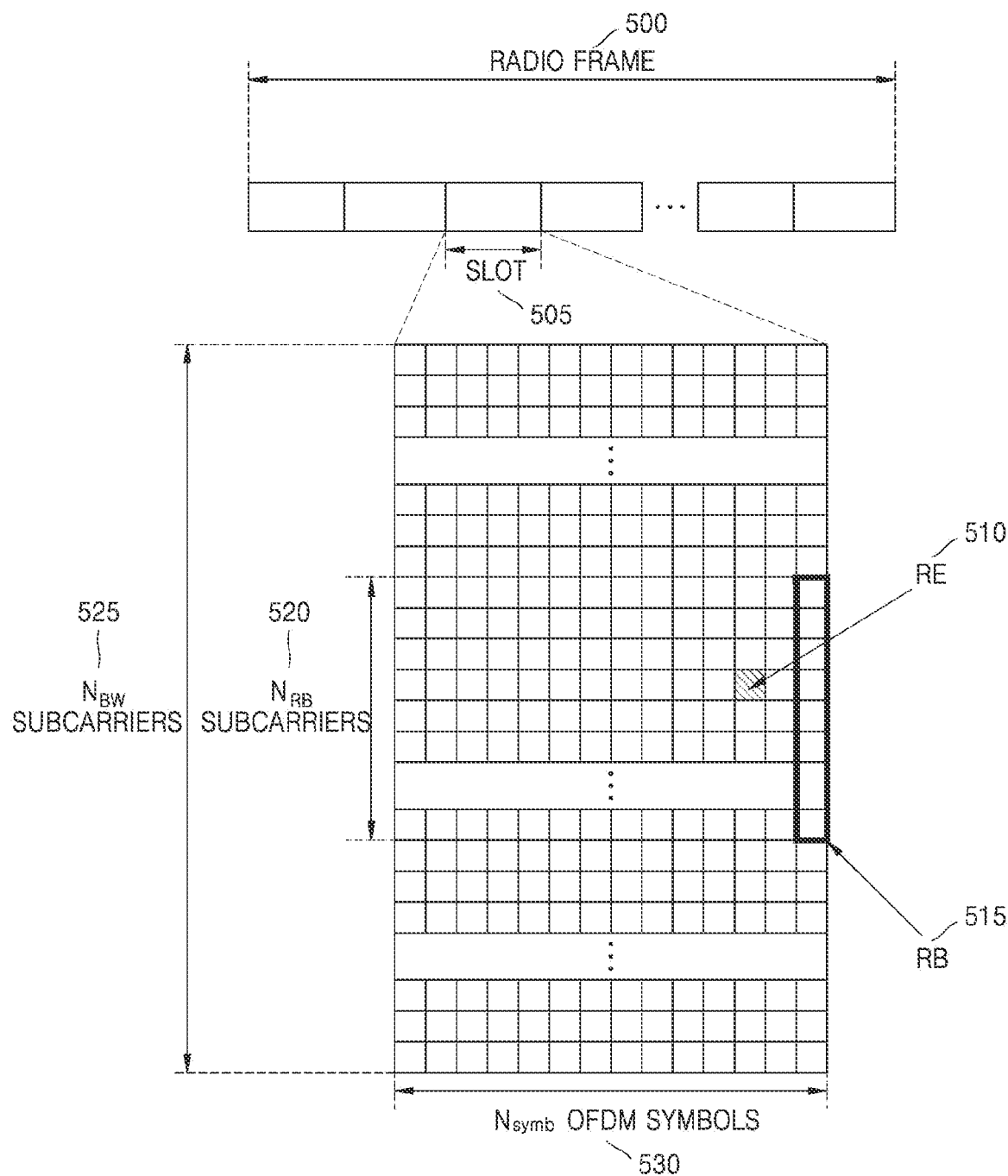
FIG. 5 illustrates a block diagram of a structure of a time-frequency resource of a wireless communication system according to an embodiment of the disclosure.

FIG. 5 illustrates a block diagram of a structure of a time-frequency resource of a wireless communication system according to an embodiment of the disclosure.

Referring to FIG. 5, in a radio resource domain, a horizontal axis thereof represents a time domain and a vertical axis thereof represents a frequency domain. A minimum transmission unit in the time domain is an OFDM symbol or a discrete Fourier transform spread OFDM (DFT-S-OFDM) symbol, and $N_{symb}$ OFDM symbols (or DFT-S-OFDM symbols) 530 may be included in one slot 505. Unlike a slot, in an NR system, a length of a subframe may be defined as 1.0 ms and a length of a radio frame 500 may be defined as 10 ms. The minimum transmission unit in the frequency domain is a subcarrier, and a bandwidth of an entire system transmission band may include a total of $N_{BW}$ subcarriers 525. Specific numerical values such as $N_{symb}$ and $N_{BW}$ may vary according to a system.

A basic unit in a time-frequency resource domain is a resource element (RE) 510, and the RE 510 may be represented by an OFDM symbol index or by a DFT-S-OFDM symbol index and a subcarrier index. A resource block (RB) 515 may be defined as $N_{RB}$ consecutive subcarriers 520 in the frequency domain. In general, a minimum transmission unit of data is an RB unit, and in the NR system, it may generally be $N_{symb}=14$ and $N_{RB}=12$.

The structure of the time-frequency resource as shown in FIG. 5 may be applied to a Uu interface. Also, the structure of the time-frequency resource as shown in FIG. 5 may be similarly applied to an SL.

An SL relay may be authenticated to be used in at least one of a particular service, a particular UE, a particular SL flow, a particular SL bearer, a particular unicast link, a particular source identifier, or a particular destination identifier. The SL relay may establish a direct communication with an authenticated UE at a time point when the SL relay is installed. In an embodiment of the disclosure, the SL relay may transmit an SL relay discovery message and perform an SL direct connection establishment procedure with the authenticated UE. In another embodiment of the disclosure, the SL relay may also receive an SL relay discovery message from the authenticated UE, transmit the SL relay discovery message to the authenticated UE, and perform an SL direct connection establishment procedure with the corresponding UE. In various embodiments of the disclosure, the SL relay discovery message may be understood as a message transmitted to and from each other to initiate an SL relay discovery procedure between an SL relay and a UE, and may include a message for discovery or a message for requesting discovery. Configuration information necessary for an SL relay UE and an SL remote UE to transmit or receive the SL relay discovery message may be obtained from a BS or may be pre-configured.

Next, an SL relay discovery procedure is described with reference to FIGS. 6A and 6B. The SL relay discovery procedure of FIGS. 6A and 6B may be applied to a UE-to-network (UE2NW) relay discovery procedure or a UE-to-UE (UE2UE) relay discovery procedure.

Figure 6A:
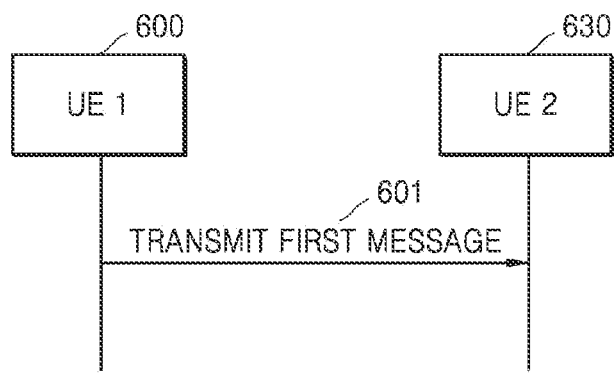
FIG. 6A illustrates a diagram for describing a sidelink relay discovery procedure according to an embodiment of the disclosure.

FIG. 6A illustrates a diagram for describing an SL relay discovery procedure according to an embodiment of the disclosure.

Referring to FIG. 6A, a UE 1 600 indicates a relay UE that functions as an SL relay, and a UE 2 630 indicates a remote UE that performs data transmission/reception to/from the BS or another UE with support from the SL relay. The UE 1 600 may obtain authentication information or service information necessary for relay functions. The authentication information or the service information necessary for relay functions may be obtained through a core network or by using an operations, administration management (OAM) method. In operation 601, the UE 1 600 may transmit an SL relay discovery message, e.g., a first message. According to the embodiment of FIG. 6A, the SL relay discovery message (first message) transmitted by the UE 1 600 may include, e.g., a discovery message.

In various embodiments of the disclosure, the first message may include information indicating the presence of an SL relay or information about a service message that may be relayed. The UE 1 600 may obtain configuration information necessary for transmission of the SL relay discovery message. The configuration information necessary for transmission of the SL relay discovery message may include at least one of a transmission resource configuration (e.g., a frequency, a bandwidth part (BWP), and a resource pool), a configuration (e.g., a parameter applied when the BS schedules a resource or when the UE 1 directly selects a resource) necessary for selecting a transmission resource, power control, a transmission parameter, a retransmission parameter, modulation and coding scheme (MCS) information for transmission of the SL relay discovery message, a target service, a target group, a target destination, a target PC5 5G QoS identifier (5QI) (PQI) list, or a target QoS parameter set list of the SL relay discovery message.

In an embodiment of the disclosure, the SL relay discovery message may be configured to be periodically transmitted. In an embodiment of the disclosure, the SL relay discovery message may be configured to be transmitted in a one-shot manner when a condition configured in the UE 1 600 is satisfied, or may be configured to be transmitted according to a certain cycle. The relay discovery message may also be aperiodically transmitted.

Figure 6B:
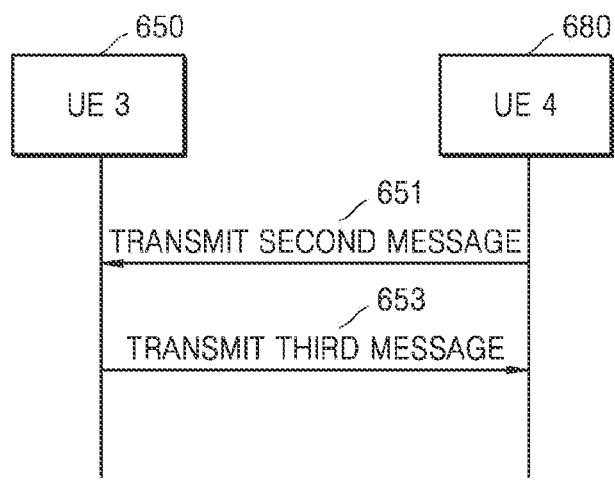
FIG. 6B illustrates a diagram for describing a sidelink relay discovery procedure according to another embodiment of the disclosure.

FIG. 6B illustrates a diagram for describing an SL relay discovery procedure according to another embodiment of the disclosure.

A UE 3 650 indicates a relay UE that functions as an SL relay, and a UE 4 680 indicates a remote UE that performs data transmission/reception to/from the BS or another UE with support from the SL relay.

As the relay UE, the UE 3 650 may obtain authentication information or service information necessary for performing SL relay-based communication. The authentication information or the service information may be obtained through a core network or by using an OAM method. As the remote UE, the UE 4 680 may obtain authentication information or service information necessary for performing SL relay-based communication. The authentication information or the service information may be obtained through a core network or by using an OAM method.

In operation 651, the UE 4 680 may transmit an SL relay discovery message, e.g., a second message. The SL relay discovery message (second message) transmitted by the UE 4 680 in operation 651 may include a discovery solicitation message. When it is determined that a condition for transmission of the second message is satisfied, the UE 4 680 may configure the second message and transmit the second message in operation 651. In various embodiments of the disclosure, the second message may be transmitted for the purpose of discovering a relay UE capable of relaying a service message desired by the remote UE.

When it is determined that the second message is received from the UE 4 680, the UE 3 650 may process the received second message. The UE 3 650 may transmit an SL relay discovery message, e.g., a third message, in response to the second message. The SL relay discovery message (third message) may include a discovery message. In various embodiments of the disclosure, the third message may be used for the purpose of notifying the presence of the relay UE capable of relaying the service message desired by the remote UE when the relay UE receives the second message from the remote UE. In an embodiment of the disclosure, when a condition for transmission of the third message is satisfied, the UE 3 650 may configure the third message and transmit the third message to the UE 4 680 in operation 653. When the third message transmitted from the UE 3 650 is received, the UE 4 680 may process the third message.

The UE 3 650 and the UE 4 680 may obtain configuration information necessary for transmission and reception of SL relay discovery messages, e.g., configuration information necessary for transmission and reception of the first message, the second message, or the third message. The configuration information necessary for reception of the SL relay discovery message may include at least one of a reception resource configuration (e.g., a frequency, a BWP, and a resource pool), a target service of the SL relay discovery message, a target group, a target destination, a target PQI list, a target QoS parameter set list, a monitoring condition configuration for the SL relay discovery message, or configuration information about a time interval for receiving the SL relay discovery message. The configuration information necessary for transmission of the SL relay discovery message may include at least one of a transmission resource configuration (e.g., a frequency, a BWP, and a resource pool), a configuration (e.g., a parameter applied when the BS schedules a resource or when the UE 3 or the UE 4 directly selects a resource) necessary for selecting a transmission resource, power control, a transmission parameter, a retransmission parameter, MCS information for transmission of the SL relay discovery message, a target service, a target group, a target destination, a PQI list, or a target QoS parameter set list of the SL relay discovery message.

In an embodiment of the disclosure, the SL relay discovery message may be configured to be periodically transmitted. In an embodiment of the disclosure, the SL relay discovery message may be configured to be transmitted in a one-shot manner when a condition configured in the UE 3 650 and the UE 4 680 is satisfied, or may be configured to be transmitted according to a certain cycle.

According to an embodiment of the disclosure, the relay discovery message (the first message, the second message, or the third message) used by the relay UE and the remote UE in the SL relay discovery procedure in FIGS. 6A and 6B may be configured as follows. The relay discovery message may include at least one of pieces of listed information with reference to [Table 1] below.

TABLE 1

(Information that may be included in the first message or the third message)
the services that Relay UE can relay. (service ID, SL flow ID, SRC ID, DST ID, unicast TABLE 1-continued link ID, PQI, SLRB ID, cast type)
the groups that Relay UE belongs to
the possible DNNs/S-NSSAIs for the service relayed by Relay UE
the serving PLMN for Relay UE
the relay UE pre-configured in the remote UE
QoS parameter set of the service that Relay can support
(Information that may be included in the second message)
the service that remote UE request to relay (service ID, SL flow ID, SRC ID, DST ID,
unicast link ID, PQI, SLRB ID, group ID, cast type)
QoS parameter set of the service that remote UE request to relay
the serving PLMN for remote UE
the groups that Remote UE belongs to In an embodiment of the disclosure, the second message may include information (e.g., a frequency, a BWP, and a resource pool) about a resource pool in which the remote UE may receive the third message of the relay UE.

In an embodiment of the disclosure, the first message or the third message may include configuration information (e.g., a relay discovery condition) for the remote UE to perform SL relay UE discovery, and configuration information (e.g., a relay selection condition) for the remote UE to perform SL relay UE discovery and select a relay UE.

In an embodiment of the disclosure, the first message or the third message may include at least one of configuration information or resource information (e.g., a frequency, a BWP, and a resource pool) used by the remote UE to transmit a message requesting establishment of a direct connection with the SL relay UE.

Figure 7:
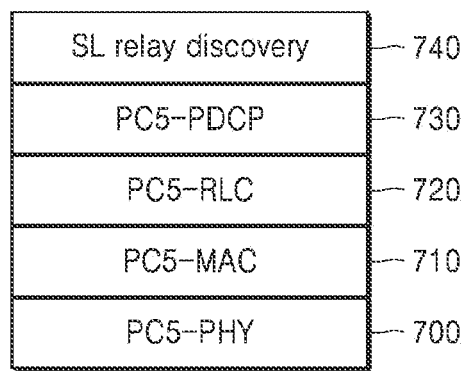
FIG. 7 illustrates a diagram for describing a protocol structure of a sidelink relay discovery message according to an embodiment of the disclosure.

FIG. 7 illustrates a diagram for describing a protocol structure of an SL relay discovery message according to an embodiment of the disclosure.

Referring to FIG. 7, the protocol structure of the SL relay discovery message may include a physical (PHY) layer 700, a MAC layer 710, a radio link control (RLC) layer 720, a packet data convergence protocol (PDCP) layer 730, and an SL relay discovery layer 740. The SL relay discovery layer 740 may configure information about an SL relay discovery message, e.g., the first message, the second message, and the third message of FIGS. 6A and 6B.

According to an embodiment of the disclosure, an SL transmission resource pool for the relay UE or the remote UE to transmit the SL relay discovery message or an SL reception resource pool for the relay UE or the remote UE to receive the SL relay discovery message may be configured in the same resource pool as a transmission resource pool or a reception resource pool for transmitting or receiving general SL data or SL signaling. Alternatively, according to another embodiment of the disclosure, an SL transmission resource pool for the relay UE or the remote UE to transmit the SL relay discovery message or an SL reception resource pool for the relay UE or the remote UE to receive the SL relay discovery message may also be configured in a resource pool separate from a transmission resource pool or a reception resource pool for transmitting or receiving general SL data or SL signaling. A resource for transmission of the SL relay discovery message may be allocated from the BS to the relay UE or the remote UE from the SL transmission resource pool or may be directly selected and allocated by the relay UE or the remote UE.

According to various embodiments of the disclosure, an operation in which the relay UE or the remote UE receives allocation of a transmission resource for transmission of the SL relay discovery message from the BS may include the following:
  (1) An operation in which the UE transmits, to the BS, signaling (e.g., an SL buffer status report (BSR)) requesting the transmission resource for transmission of the SL relay discovery message, and an operation in which the UE receives allocation of the transmission resource from the BS; and
  (2) An operation in which the BS configures (e.g., an SL configured grant type 1 configuration or an SL configured grant type 2 configuration) the UE to periodically or semi-persistently allocate the transmission resource for transmission of the SL relay discovery message, and an operation in which the BS allocates the transmission resource to the UE based on the above configuration.

According to various embodiments of the disclosure, an operation in which the relay UE or the remote UE directly selects and receives allocation of a transmission resource for transmission of the SL relay discovery message may include the following:
  (1) An operation in which the UE senses a resource pool configured for the purpose of transmitting the SL relay discovery message, and selects and allocates a resource; and
  (2) An operation in which the UE selects an arbitrary resource from a resource pool configured for the purpose of transmitting the SL relay discovery message and allocates the resource.

According to an embodiment of the disclosure, the UE may obtain an SL discovery resource configuration available to transmit the SL relay discovery message from signaling of the BS or pre-configured information. The SL discovery resource configuration may include at least one of parameters listed in [Table 2] below, and the SL discovery resource configuration may be described with reference to contents of [Table 2].

TABLE 2

SL discovery resource pool (TX, RX) // SL relay discovery message transmission
resource pool, SL relay discovery message reception resource pool
SL discovery specific resource pool (TX, RX) // Transmission and reception resource
pools separately defined for the purpose of SL relay discovery
SL discovery and SL data common resource pool (TX, RX) // Transmission and
reception resource pools defined for the purposes of SL relay discovery and common SL
messages TABLE 2-continued SL discovery period // SL relay discovery period. This period may be used to indicate
a period for monitoring(receiving) an SL relay discovery message and a period for transmitting
an SL relay discovery message.
If discoveryRXPool is configured, from the next SL discovery period, UE use the
resources indicated by discovery RX pool for SL relay discovery monitoring // When it is
determined that an SL relay discovery message reception pool is configured, from a next SL
discovery period, the UE may monitor resources of a reception resource pool configured for the
purpose of an SL relay discovery message to monitor the SL relay discovery message.
If discoveryTXPool is configured, from the next discovery period, UE use the
resources indicated by discovery TX pool for SL relay discovery transmission // When it is
determined that an SL relay discovery message transmission pool is configured, from a next SL
discovery period, the UE may use resources of a transmission resource pool configured for the
purpose of an SL relay discovery message to transmit the SL relay discovery message.
If release indicated, from the next discovery period, UE release the resources allocated
for SL relay discovery transmission which is previously configured // When it is determined that
an SL relay discovery message transmission pool is released, from a next SL discovery period,
the UE may determine to release resources configured for the purpose of transmitting an SL relay
discovery message.
Discovery gap // When it is determined that the UE may not be able to simultaneously
transmit or receive an SL relay discovery message and perform Uu communication with the BS,
a discovery gap (at least one of a transmission gap or a reception gap) may be configured for the
UE.
If discoveryGapRX is configured, from the next gap period, UE use the gaps indicated
by the configuration for SL relay discovery monitoring // When it is determined that a reception
gap is configured, from a next gap period, the UE may perform an operation of a discovery gap
configured to monitor an SL relay discovery message. The UE may monitor the SL relay
discovery message in a discovery gap period.
If discoveryGapTX is configured, from the next gap period, UE use the gaps indicated
by the configuration for SL relay discovery transmission // When it is determined that a
transmission gap is configured, from a next gap period, the UE may perform an operation of a
discovery gap configured to transmit an SL relay discovery message. The UE may transmit the
SL relay discovery message in a discovery gap period.
TX parameter configuration for discovery message // A transmission UE may transmit
a message by applying a configured TX parameter when an SL relay discovery message is
transmitted. The TX parameter may include at least one of TX power, information indicating
whether to retransmit a hybrid automatic repeat request (HARQ) and the number of HARQ
retransmissions, or MCS information.
TX power, HARQ retransmission, MCS
Synchronization configuration for discovery message // Synchronization configuration
information to be applied by the UE in transmission and reception of an SL relay discovery
message is included. In the transmission and reception of the SL relay discovery message, the
UE may process synchronization with respect to at least one of a global navigation satellite
system (GNSS), a gNB, an eNB, or another UE, based on the synchronization configuration
information.

Next, an operation of the UE (relay UE or remote UE) for transmitting an SL relay discovery message is described with reference to FIGS. 8A and 8B. The SL relay discovery message may include at least one of the transmitted messages described with reference to FIGS. 6A and 6B.

Figure 8A:
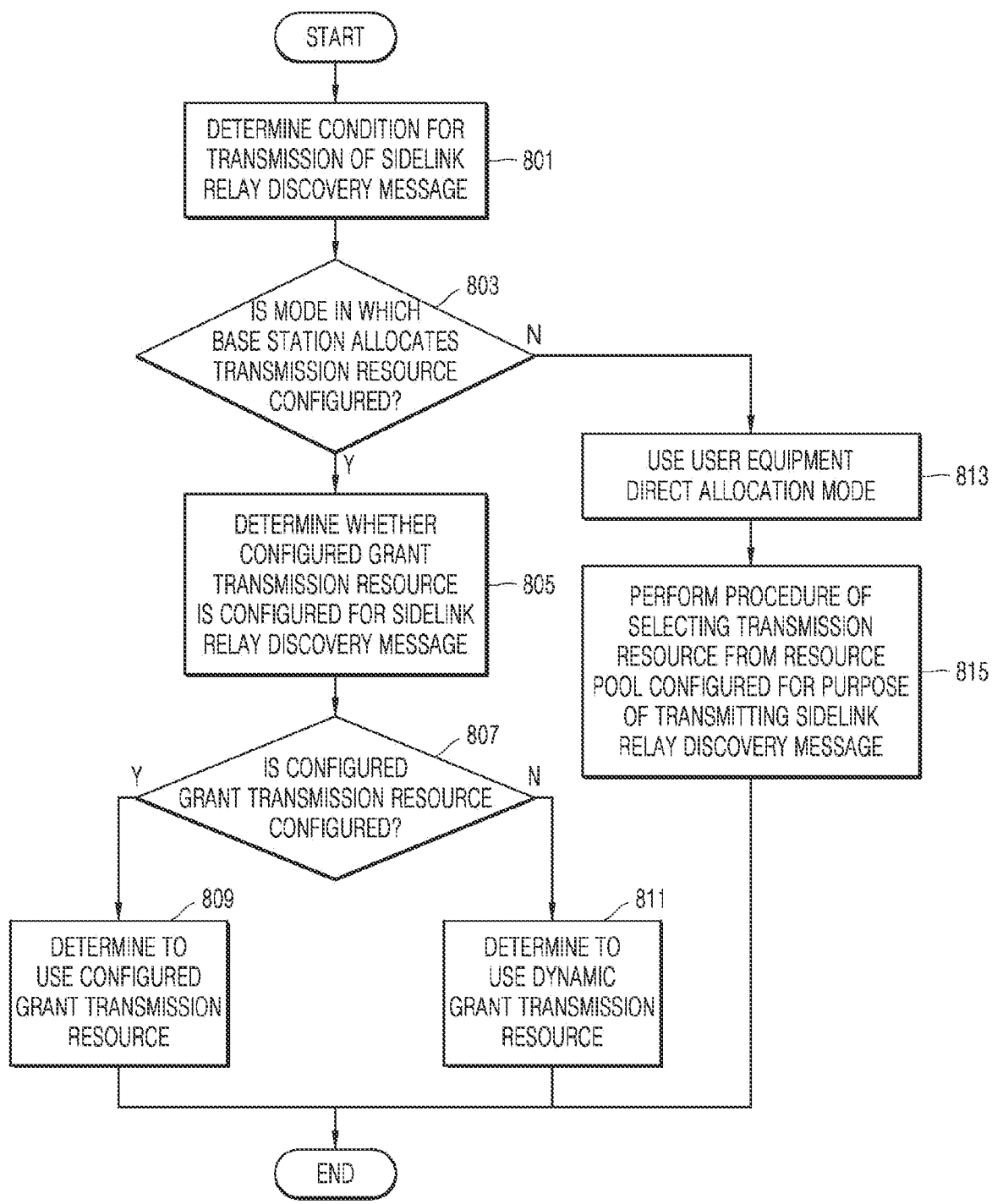
FIG. 8A illustrates a flowchart for describing an operation of processing allocation of a resource for transmission of a sidelink relay discovery message according to an embodiment of the disclosure.

FIG. 8A illustrates a flowchart for describing an operation of processing allocation of a transmission resource for transmission of an SL relay discovery message according to an embodiment of the disclosure.

Referring to FIG. 8A, in operation 801, the UE may determine whether a condition for transmission of the SL relay discovery message is satisfied. In operation 803, the UE may determine whether a mode is configured to a mode in which the BS allocates an SL transmission resource on which the SL relay discovery message is to be transmitted. According to the determination in operation 803, when the mode is configured to the mode in which the BS performs allocation, the UE may proceed to operation 805. In operation 805, the UE may determine whether a configured grant transmission resource for transmission of the SL relay discovery message is configured by the BS for the UE. In this case, the UE may determine whether the configured grant transmission resource is configured for an LCH corresponding to the SL relay discovery message.

The configured grant transmission resource may include a configured grant type 1 (a type in which, in addition to indication information about which configured grant resource configuration is to be used for an LCH, time information or frequency information about actual SL resource allocation for the corresponding LCH is also indicated by an RRC message) or a configured grant type 2 (a type in which indication information about which configured grant resource configuration is to be used for an LCH is indicated by an RRC message and time information or frequency information about actual SL resource allocation for the corresponding LCH is indicated by a PDCCH). In operation 807, the UE may determine whether the configured grant transmission resource is configured for the LCH for the SL relay discovery message. When it is determined that the configured grant transmission resource is configured for the LCH for the SL relay discovery message, for transmission of the SL relay discovery message, the UE may determine to use the corresponding configured grant transmission resource in operation 809.

Configuration information about the configured grant transmission resource, configured by the BS for the UE, necessary for transmission of the SL relay discovery message may include parameters listed in [Table 3] and [Table 4]. For descriptions of the configuration information about the configured grant transmission resource, [Table 3] and [Table 4] below may be referred to.

TABLE 3

SL-DiscoveryConfiguredGrantConfigList ::= SEQUENCE {
sl-DiscoveryConfiguredGrantConfigToReleaseList    SEQUENCE    (SIZE
(1..maxNrofDiscoveryCG-SL)) OF SL-DiscoveryConfigIndexCG OPTIONAL, -- Need
N
sl-DiscoveryConfiguredGrantConfigToAddModList    SEQUENCE    (SIZE
(1..maxNrofDiscoveryCG-SL)) OF SL-DiscoveryConfiguredGrantConfig OPTIONAL -
- Need N
}
The BS may provide the UE with a configuration including at least one of addition,
modification, or release of a configured grant configuration to be used for an SL relay
discovery message. Detailed information about the configured grant configuration
provided by the BS to the UE may include SL-DiscoveryConfiguredGrantConfig. The
SL-DiscoveryConfiguredGrantConfig may include at least one of a configured grant type
1 scheme resource allocation configuration or a configured grant type 2 scheme resource
allocation configuration to be used in transmission of the SL relay discovery message.
SL-DiscoveryConfiguredGrantConfig ::=    SEQUENCE {
    sl-DiscoveryConfigIndexCG    SL-DiscoveryConfigIndexCG, // Indicates an index of a
configured grant type 1 or a configured grant type 2
    sl-CG-Period    SL-CGPeriod    OPTIONAL, -- Need M // Indicates a resource
allocation period (configured grant period) of a configured grant type 1 or a configured
grant type 2
When a configured grant period value is configured, the BS may configure the value based
on an SL-discoveryPeriod value of an SL relay discovery message transmission resource
pool or may configure the value as a value separate from the SL-discoveryPeriod. When
a sl-CGPeriod value is configured based on the SL-discoveryPeriod value of the SL relay
discovery message transmission resource pool, the BS may include index information
about the corresponding SL relay discovery message transmission resource pool in the
configuration information. The SL-discoveryPeriod may include the SL discovery period
in [Table 2].
    sl-NrOfHARQ-Processes INTEGER (1..16) OPTIONAL, -- Need M // Number of
HARQ processes to be applied to transmission of an SL relay discovery message
    sl-HARQ-ProcID-offset INTEGER (1..16) OPTIONAL, -- Need M // HARQ process
offset to be applied to transmission of an SL relay discovery message
    sl-CG-MaxTransNumList SL-CG-MaxTransNumList OPTIONAL, -- Need M //
Maximum number of transmissions to be applied to transmission of an SL relay discovery
message
    rrc-ConfiguredSidelinkGrant    SEQUENCE {
        sl-TimeResourceCG-Type1 INTEGER (0..496) OPTIONAL, -- Need M
        sl-StartSubchannelCG-Type1 INTEGER (0..26) OPTIONAL, -- Need M
        sl-FreqResourceCG-Type1 INTEGER (0..6929) OPTIONAL, -- Need M
        sl-TimeOffsetCG-Type1 INTEGER (0..7999) OPTIONAL, -- Need R
        sl-ResourcePoolID    SL-ResourcePoolID    OPTIONAL, -- Need M // Indication
information about an SL transmission resource pool to which a configured grant to
transmit an SL relay discovery message is applied
        sl-TimeReferenceSFN-Type1 ENUMERATED {sfn512} OPTIONAL -- Need S
    } OPTIONAL, -- Need M // A field with Type 1 corresponds to information about actual
resource allocation of a configured grant type 1 for the purpose of transmitting an SL relay
discovery message.
    ...
}
When the BS configures a maximum number of transmissions of the SL relay discovery
message for the UE, the BS may configure a numRetx value of the SL relay discovery
message transmission resource pool to be used as the maximum number of transmissions
of the SL relay discovery message. The BS may configure separate fields for the UE as
follows, instead of indicating the numRetx of the SL relay discovery message transmission
resource pool.
SL-CG-MaxTransNumList ::=    SEQUENCE (SIZE (1..8)) OF SL-CG-MaxTransNum
SL-CG-MaxTransNum ::=    SEQUENCE {
    sl-Priority    INTEGER (1..8) OPTIONAL, //When a fixed priority is configured
for the SL relay discovery message, the BS does not need to configure this field in the UE.
    sl-MaxTransNum    INTEGER (1..32)
}

In this case, an example of configuring the parameters listed in [Table 3] is described in detail.

A sl-CGPeriod value, i.e., an SL CG period for CG Type 1 and an SL CG period for CG Type 2, may be configured to be aligned with an SL discovery period of the SL transmission resource pool configured for the purpose of transmitting the SL relay discovery message. That is, the SL CG period for CG Type 1 and the SL CG period for CG Type 2 may be configured to be a value equal to the SL discovery period or an integer multiple of the SL discovery period. The SL discovery period may include the SL discovery period in [Table 2].

A sl-CGPeriod value, i.e., an SL CG period for CG Type 1 and an SL CG period for CG Type 2, may be configured to be aligned with an SL discovery TX gap pattern of the SL relay discovery message. When the SL discovery TX gap pattern is configured in the UE, the BS may configure the sl-CGPeriod value by determining the SL discovery TX gap pattern of the corresponding UE, i.e., a time point at which an SL discovery TX may be transmitted. The BS may configure the sl-CGPeriod value in the corresponding UE as a value equal to a gap period of the SL discovery TX gap pattern or an integer multiple of the gap period. The gap period may include the (discovery?) gap period in [Table 2].

The BS may receive assistance information from the UE to determine period information for at least one of the SL-CGPeriod, the gap period of the SL discovery TX gap pattern, or the SL discovery period. The assistance information from the UE may be transmitted to the BS by using at least one of a SidelinkUEInformation (SUI) message or a UEAssistanceInformation message. When a UE authenticated as an SL relay UE or an SL remote UE is configured to transmit assistance information necessary for the SL-CGPeriod, the SL discovery TX gap pattern, and the SL discovery period which are necessary for transmission of the SL relay discovery message, the UE may transmit the assistance information to the BS. When it is determined that a condition for transmission of the SL relay discovery message is satisfied, the SL relay UE and the SL remote UE may transmit the assistance information to the BS. This assistance information may be used for the purpose of the UE requesting the BS to allocate an SL relay discovery message transmission resource and to configure a gap of the SL relay discovery message. The BS may determine allocation of the SL relay discovery message transmission resource for the UE, and a TX gap configuration or an RX gap configuration of the SL relay discovery message, with reference to the assistance information from the UE, and may provide the same to the UE.

The assistance information transmitted by the UE for the SL relay discovery message may include at least one or a combination of the following. carrier frequency (information about a frequency supporting SL relay discovery of the UE), gap pattern information (which is information about a gap pattern preferred by the UE and may include at least one of a gap period list, a gap offset, or a gap bitmap.) The gap period list indicates gap period information, and when a gap bitmap is included in the gap period list, the gap period may indicate a repetition period of the gap bitmap. The gap offset indicates an offset at which a first gap period starts and may be expressed as an offset from SFN 0. The gap bitmap may indicate a time resource (e.g., including at least one of a subframe, a slot, or a symbol) on which the SL relay discovery message may be transmitted, the number of SL relay discovery messages to be transmitted in a discovery period, and a size of the SL relay discovery message to be transmitted in a discovery period (e.g., the size of the SL relay discovery message may be variable, and thus, an average value or a maximum value may be provided).

When the BS configures a configured grant for the purpose of transmitting the SL relay discovery message for the UE, the BS may configure the SL-CGPeriod by using at least one of the following methods. The SI-CGPeriod may be configured by utilizing the SL discovery period. The BS may provide the UE with an SL discovery period index corresponding to the SL discovery period and SL-CGPeriod mapping information. One or more pieces of SL-CGPeriod information may be included. The SL-CGPeriod may be configured separately from the SL discovery period. The BS may configure the SL-CGPeriod value and provide the value to the UE. One or more pieces of SL-CGPeriod information may be included. The BS may configure the same configured grant configuration for LCHs of SL relay discovery messages used in an SL relay discovery model A (see FIG. 6A) and an SL relay discovery model B (see FIG. 6B), or may configure a different configured grant configuration for each of the LCHs of the SL relay discovery messages used in the SL relay discovery models A and B. The BS may provide the UE with an LCH of an SL relay discovery message and a configured grant configuration mapped to the LCH.

When the UE obtains configured grant configuration information corresponding to the LCH of the SL relay discovery message from the BS, the UE may transmit the SL relay discovery message by obtaining an SL transmission resource according to the configured grant configuration information mapped to the LCH of the SL relay discovery message determined by the UE to transmit.

The BS may designate a configured grant configuration mapped to an LCH corresponding to the SL relay discovery message. In this case, one or more SL relay discovery messages may be included. The BS may designate configured grant configurations mapped to LCHs corresponding to the SL relay discovery messages corresponding to the SL relay discovery models (see FIGS. 6A and 6B). For example, the BS may designate a configured grant configuration for an LCH corresponding to the SL relay discovery message used in FIG. 6A. The UE may obtain the configured grant configuration mapped to the LCH corresponding to the SL relay discovery message from the BS and may use a configured grant to transmit an SL relay discovery message corresponding to an LCH indicated by configured grant configuration information. In this case, one or more LCHs may be included. Also, in this case, one or more configured grants may be included. The configured grant configuration mapped to the LCH corresponding to the SL relay discovery message configured by the BS for the UE may include parameters listed in [Table 4] and may be described based on contents of [Table 4].

TABLE 4

The BS may configure, for the UE, at least one information among a configured grant type 1 or a configured grant type 2 to be used in an LCH corresponding to an SL relay discovery message. The information about the configured grant type 1 or the configured grant type 2 configured for the LCH may be indicated by SL-DiscoveryConfigIndexCG. The SL-DiscoveryConfigIndexCG corresponds to an index of corresponding DiscoveryConfiguredGrantConfig in [Table 3].
SL-DiscoveryLogicalChannelConfig ::= SEQUENCE {
    sl-DiscoveryLCH      ENUMERATED    {SCCH-A, SCCH-B, SCCH-A_SCCH-B}
OPTIONAL, -- Need R // Information indicating an LCH corresponding to an SL relay discovery message. In this case, when there are two LCHs corresponding to the SL relay discovery message, an SCCH-A and an SCCH-B are considered. When the SCCH-A is configured, it indicates that a configured grant configuration is applied to an SCCH-A LCH, when the SCCH-B is configured, it indicates that a configured grant configuration TABLE 4-continued is applied to an SCCH-B LCH, and when SCCH-A_SCCH-B is configured, it indicates
that a configured grant configuration is applied to an SCCH-A LCH and an SCCH-B LCH.
Less than two LCHs or more than two LCHs corresponding to the SL relay discovery
message may be configured, and this parameter may be extended to information indicating
one LCH or a plurality of LCHs.
   sl-DiscoveryConfiguredGrantType1Allowed   ENUMERATED {true} OPTIONAL, --
Need R // When this field value is true, it indicates that a configured grant type 1 scheme
resource may be used for an LCH corresponding to an SL relay discovery message.
   sl-DiscoveryConfiguredGrantType2Allowed ENUMERATED {true} OPTIONAL, -
- Need R // When this field value is true, it indicates that a configured grant type 2 scheme
resource may be used for an LCH corresponding to an SL relay discovery message.
   sl-AllowedDiscoveryCG-List SEQUENCE (SIZE (0..max.NrofDiscoveryCG-SL-1)) OF
SL-DiscoveryConfigIndexCG OPTIONAL, -- Need R // Index for a configured grant type
(at least one of type 1 or type 2) configuration available for an LCH (an indicated LCH)
corresponding to an SL relay discovery message
   ...
}

In this case, an example of configuring the parameters in [Table 4] is described in detail.

- When more than one SL logical channel (SL LCH) is configured for SL relay discovery messages, e.g., when an SL LCH (SCCH-A) configured in an SL relay discovery message used in a model A procedure and an SL LCH (SCCH-B) configured in an SL relay discovery message used in a model B procedure are differently configured, the sl-DiscoveryLCH parameter may be used for the purpose of identifying configured grants configured for the SL LCHs. When one SL LCH is configured for the SL relay discovery messages, e.g., when SL LCHs configured in the SL relay discovery messages used in the model A procedure and the model B procedure are equally configured (SCCH-A), the SL-DiscoveryLCH parameter does not need to be included.
- The sl-DiscoveryConfiguredGrantType1Allowed parameter may refer to configuring an SL CG type 1 to be used for an SL LCH configured in an SL relay discovery message.
- When one or more LCHs are configured for SL relay discovery messages, the UE may identify whether an SL CG type 1 is configured to be used for an LCH corresponding to an SL relay discovery message to be transmitted, and then may determine to use the SL CG type 1.
- The sl-DiscoveryConfiguredGrantType2Allowed parameter may refer to configuring an SL CG type 2 to be used for an SL LCH configured in an SL relay discovery message.
- When one or more LCHs are configured for SL relay discovery messages, the UE may identify whether an SL CG type 2 is configured to be used for an LCH corresponding to an SL relay discovery message to be transmitted, and then may determine to use the SL CG type 2.
- The Sl-DiscoveryConfiguredCG-List parameter may indicate information indicating an SL CG to be used for an SL LCH configured in an SL relay discovery message. The UE may identify an SL CG index and an SL CG configuration mapped to the SL CG index.
- When one or more LCHs are configured for SL relay discovery messages, the UE may identify information about an SL CG configured for an LCH corresponding to an SL relay discovery message to be transmitted, and may use this SL CG in a case where the SL CG is allowed to be used when the SL relay discovery message of the corresponding LCH is transmitted.

When it is determined in operation 807 that the configured grant transmission resource is configured for the LCH for the SL relay discovery message, in operation 811, the UE may determine to use a dynamic grant transmission resource for transmission of the SL relay discovery message. The UE that has determined to use the dynamic grant transmission resource in operation 811 may perform an operation according to the presence of a transmission resource allocated by the BS in a dynamic grant scheme as follows. For example, when it is determined that there is a transmission resource allocated by the BS in the dynamic grant scheme, the UE may transmit the SL relay discovery message by using the corresponding resource. As another example, when it is determined that there is no transmission resource allocated by the BS in the dynamic grant scheme, the UE may perform a transmission resource request procedure for transmitting the SL relay discovery message (in this case, the UE may transmit an SL-BSR to the BS and receive allocation of an SL transmission resource from the BS).

According to the determination in operation 803, when the UE determines that the mode is not the mode in which the BS performs allocation, the UE may use a UE direct allocation mode in operation 813. In operation 813, the UE may determine whether the BS has configured the UE to use the UE direct allocation mode, or may determine whether the UE needs to use the UE direct allocation mode without an indication from the BS. When the BS indicates the UE in an RRC_CONNECTED state to use the UE direct allocation mode or when the UE is positioned in one of an RRC_IDLE state, an RRC_INACTIVE state, or an OUT OF COVERAGE state and thus determines to use the UE direct allocation mode without an indication from the BS, the UE may use the UE direct allocation mode. Then, the UE may proceed to operation 815 and may perform an operation of selecting a transmission resource from a resource pool configured for the purpose transmitting of the SL relay discovery message. An example of an operation in which the UE selects the transmission resource from the resource pool configured for the purpose of transmitting the SL relay discovery message is as follows. The UE may select an available resource by sensing a resource pool for the purpose of transmitting an SL relay discovery message.

Alternatively, the UE may select an arbitrary resource from a resource pool for the purpose of transmitting an SL relay discovery message. When an SL discovery period is configured in a resource pool configured for the purpose of transmitting an SL relay discovery message, the UE may allocate an SL transmission resource to a MAC packet data unit (PDU) including an SL relay discovery message to be transmitted during the SL discovery period, by sensing the resource pool configured for the purpose of transmitting the SL relay discovery message. When an SL discovery period is configured in a resource pool configured for the purpose of transmitting an SL relay discovery message, the UE may allocate an SL transmission resource to a MAC PDU including an SL relay discovery message to be transmitted during the SL discovery period, by arbitrarily selecting the SL transmission resource from the resource pool configured for the purpose of transmitting the SL relay discovery message.

Figure 8B:
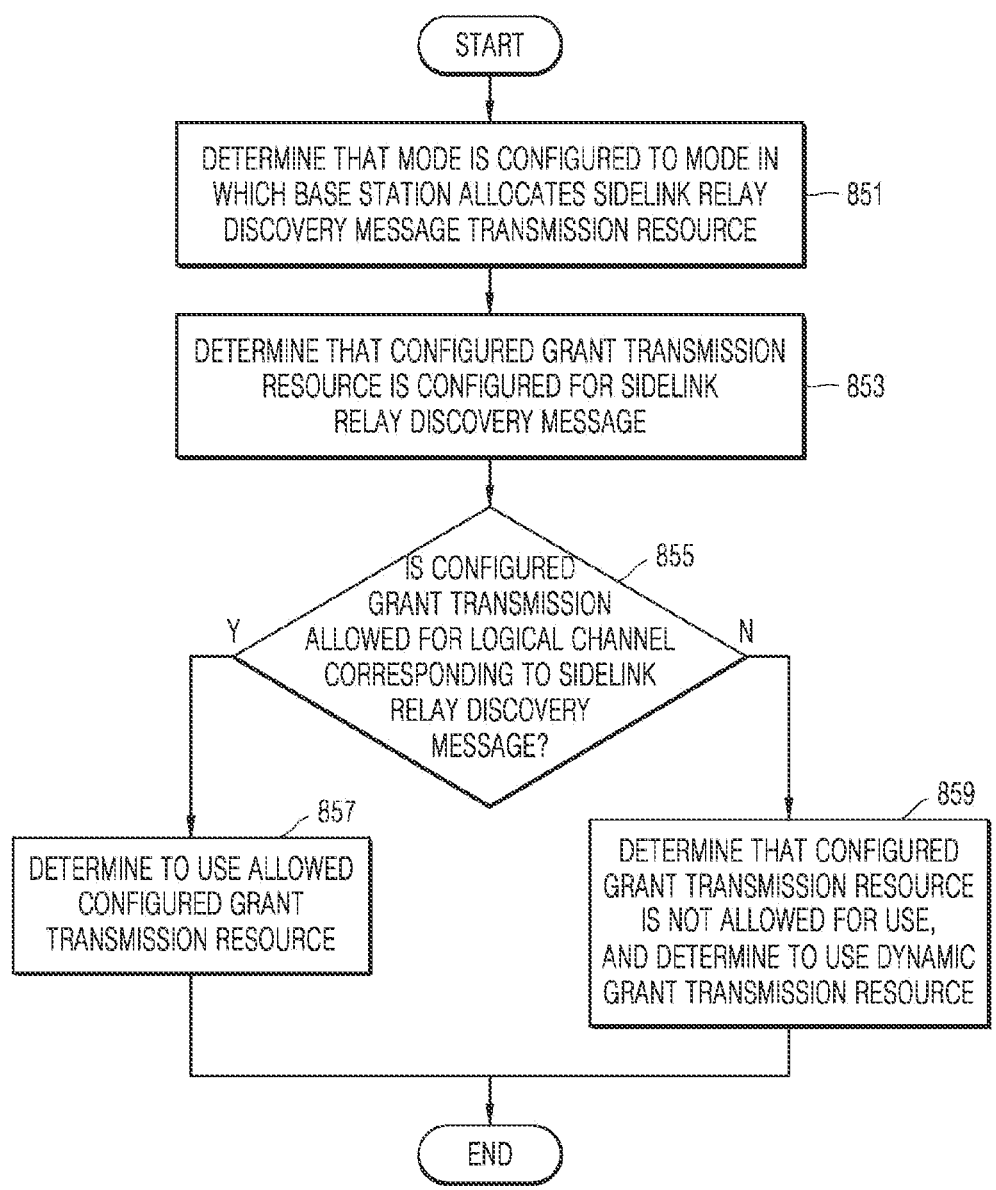
FIG. 8B illustrates a flowchart for describing an operation of processing allocation of a resource for transmission of a sidelink relay discovery message according to another embodiment of the disclosure.

FIG. 8B illustrates a flowchart for describing an operation of processing allocation of a resource for transmission of an SL relay discovery message according to another embodiment of the disclosure.

Referring to FIG. 8B, in operation 851, the UE may determine that the mode is configured to a mode in which the BS allocates an SL relay discovery message transmission resource to the UE. The BS may transmit information configuring whether to allow or disallow transmission of a configured grant for an LCH corresponding to the SL relay discovery message, to the UE (relay UE or remote UE) capable of transmitting the SL relay discovery message. When a plurality of LCHs are configured for each SL relay discovery message, the BS may transmit information configuring whether to allow or disallow transmission of a configured grant for each LCH, to the UE (relay UE or remote UE) capable of transmitting the SL relay discovery message. A configured grant configuration for an LCH corresponding to the SL relay discovery message may include indication information indicating that a configured grant type 1 and/or a configured grant type 2 is allowed or disallowed. The configured grant configuration for the LCH corresponding to the SL relay discovery message may include information about an allowed configured grant type 1 index list and/or configured grant type 2 index list.

In operation 853, the UE may determine that the UE is configured to use a configured grant transmission resource for the SL relay discovery message. Configuration information in operation 853 may include information listed in [Table 3] and [Table 4]. In operation 855, the UE may determine whether the UE is configured to use a configured grant resource for an LCH corresponding to an SL relay discovery message to be transmitted by the UE. According to the determination in operation 855, when the UE is configured to use the configured grant resource for the LCH corresponding to the SL relay discovery message (or when the configured grant resource is allowed), in operation 857, the UE may determine that a MAC PDU including the SL relay discovery message may be transmitted by using a configured grant transmission resource for the LCH.

According to the determination in operation 855, when the UE is not configured to use the configured grant resource for the LCH corresponding to the SL relay discovery message (or when the configured grant resource is not allowed), in operation 859, the UE may determine that a configured grant transmission resource may not be used for the LCH and a MAC PDU including the SL relay discovery message may be transmitted by using a dynamic grant transmission resource. The UE that has determined to use the dynamic grant transmission resource may perform an operation according to the presence of a transmission resource allocated by the BS in a dynamic grant scheme as follows.

For example, when there is a transmission resource allocated by the BS in the dynamic grant scheme, the UE may transmit the SL relay discovery message by using the corresponding resource. As another example, when there is no transmission resource allocated by the BS in the dynamic grant scheme, the UE may perform a transmission resource request procedure for transmitting the SL relay discovery message (the UE may transmit an SL-BSR to the BS and receive allocation of a transmission resource from the BS).

Next, an operation in which the UE (SL relay UE or SL remote UE) processes resource allocation for transmitting a general SL message (at least one of PC5-S signaling, a PC5-RRC message, a PC5 user packet, or a PC5 MAC CE), in addition to the SL relay discovery message is described with reference to FIG. 9.

Figure 9:
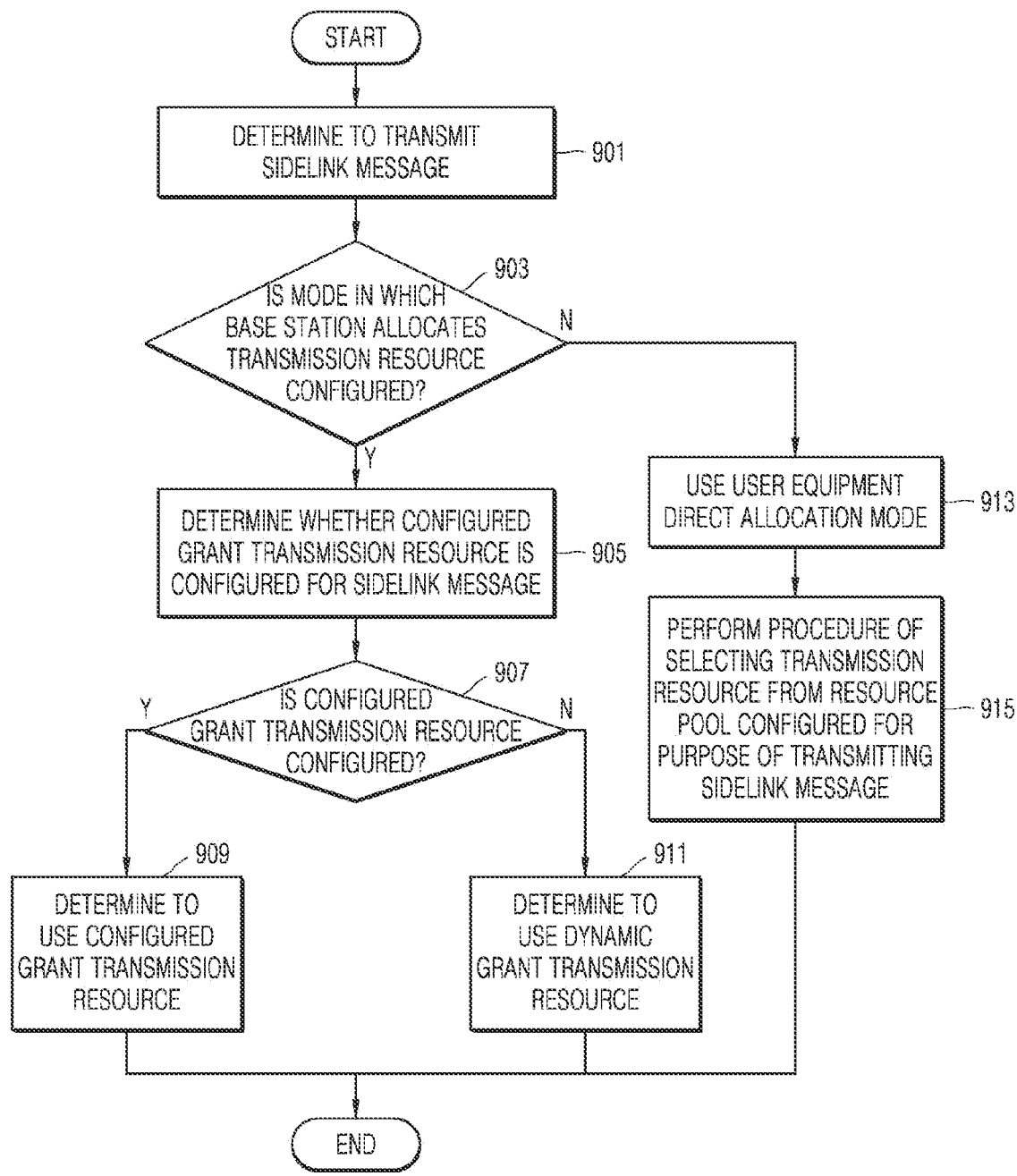
FIG. 9 illustrates a flowchart for describing an operation of processing allocation of a resource for transmission of a sidelink message according to an embodiment of the disclosure.

FIG. 9 illustrates a flowchart for describing an operation of processing allocation of a resource for transmission of an SL message according to an embodiment of the disclosure.

Referring to FIG. 9, in operation 901, the UE may determine that an SL message to be transmitted has been generated. In operation 903, the UE may determine whether a mode in which the BS allocates a transmission resource to the UE is configured. According to the determination in operation 903, when the mode in which the BS allocates the transmission resource to the UE is configured, in operation 905, the UE may determine that the BS has configured, for the UE, a configured grant transmission resource for the purpose of transmitting the SL message. In operation 907, the UE may determine whether the UE is configured to use the configured grant transmission resource for an LCH corresponding to the SL message.

According to the determination in operation 907, when it is determined that the UE is configured to use the configured grant transmission resource for the LCH corresponding to the SL message, in operation 909, the UE may transmit the SL message by using an allocated resource indicated by the configured grant transmission resource. When it is determined in operation 905 that the UE is not configured to use the configured grant transmission resource for the LCH corresponding to the SL message, the UE may determine that the UE may transmit the SL message by using a transmission resource allocated in a dynamic grant scheme. The UE that has determined to use a dynamic grant transmission resource may perform an operation according to the presence of the transmission resource allocated by the BS in the dynamic grant scheme as follows.

For example, when there is a transmission resource allocated by the BS in the dynamic grant scheme, the UE may transmit the SL message by using the corresponding resource. As another example, when there is no transmission resource allocated by the BS in the dynamic grant scheme, the UE may perform a transmission resource request procedure for transmitting the SL message (the JE may transmit an SL-BSR to the BS and receive allocation of a transmission resource from the BS).

According to the determination in operation 903, when it is determined that the mode in which the BS allocates the transmission resource to the UE is not configured, the UE may proceed to operation 913 and use a JE direct allocation mode. In operation 913, the UE may determine whether the BS has configured a mode for directly selecting a transmission resource for the UE, or the UE may determine whether the UE needs to use the UE direct allocation mode without an indication from the BS. When the BS indicates the UE in an RRC_CONNECTED state to use the UE direct allocation mode or when the JE is positioned in one of an RRC_IDLE state, an RRC_INACTIVE state, or an OUT OF COVERAGE state and thus determines to use the UE direct allocation mode without an indication from the BS, the UE may use the UE direct allocation mode. Then, the UE may proceed to operation 915 and may perform an operation of selecting a transmission resource from a resource pool configured for the purpose transmitting of the SL message.

An example of an operation in which the UE selects the transmission resource from the resource pool configured for the purpose of transmitting the SL message is as follows. The UE may select an available resource by sensing a resource pool for the purpose of transmitting an SL message. Alternatively, the UE may select an arbitrary resource from a resource pool for the purpose of transmitting an SL message.

According to various embodiments of the disclosure, a CG type 1 or CG type 2 resource may be allocated for the purpose of transmitting a general SL message (including at least one of PC5-RRC, PC5-S signaling, a PC5 user packet, or PC5 MAC CE), separately from CG type 1 or CG type 2 resource allocation for transmitting an SL relay discovery message. The BS may transmit, to the UE, at least one resource allocation configuration among CG type 1 or CG type 2 for the purpose of transmitting a general SL message, and may allocate a transmission resource to the UE in at least one method among the CG type 1 or the CG type 2 according to the above configuration.

The UE (remote UE or relay UE) may determine transmission of an SL relay discovery message or transmission of a general SL message, and may determine a CG type 1 or CG type 2 resource allocation configuration corresponding to an SL relay discovery message configured by the BS or a general SL message.

The UE that transmits a general SL message may transmit the general SL message by using the CG type 1 or CG type 2 resource configured for the purpose of transmitting the general SL message.

According to an embodiment of the disclosure, when priorities of SL MAC PDUs that may use an SL relay discovery message transmission resource are different, i.e., when an SL MAC PDU A and an SL MAC PDU B have different priorities and the UE needs to determine a MAC PDU to be preferentially transmitted among the SL MAC PDU A and the SL MAC PDU B during an SL discovery period, the UE may apply a preemption procedure to the SL MAC PDU A and the SL MAC PDU B. The preemption procedure may be applied even when a MAC PDU corresponding to the SL relay discovery message and a MAC PDU corresponding to the general SL message are allocated resources of the same transmission resource pool. The preemption procedure may also be applied even when determining for which SL MAC PDU (corresponding to the SL relay discovery message or the general SL message) a transmission resource is reserved for, and whether to transmit another SL MAC PDU (corresponding to the SL relay discovery message or the general SL message) or which SL MAC PDU is to be transmitted at a time point when the corresponding transmission resource is available.

Figure 10:
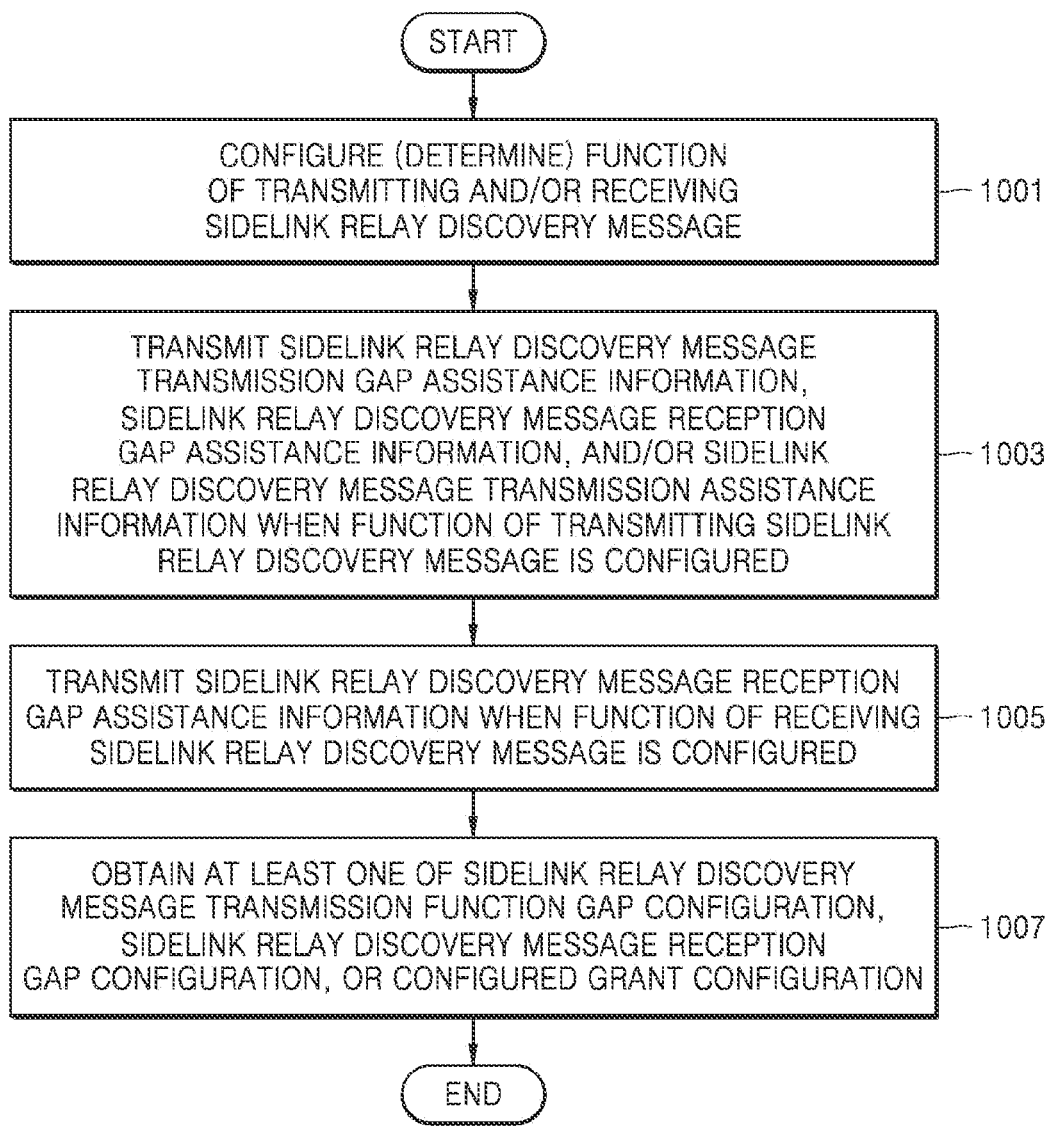
FIG. 10 illustrates a flowchart for describing an operation of processing a sidelink relay discovery message transmission and reception configuration according to an embodiment of the disclosure.

FIG. 10 illustrates a flowchart for describing an operation of processing an SL relay discovery message transmission and reception configuration according to an embodiment of the disclosure.

Referring to FIG. 10, in operation 1001, the UE may determine whether a function of transmitting and/or receiving an SL relay discovery message is configured. When the UE determines that the function of transmitting the SL relay discovery message is configured, in operation 1003, the UE may transmit, to the BS, SL relay discovery message transmission gap assistance information, SL relay discovery message reception gap assistance information, and/or SL relay discovery message transmission assistance information. The SL relay discovery message transmission assistance information transmitted by the UE to the BS may be used as assistance information for the BS to configure a configured grant type 1 and/or a configured grant type 2 for the UE as an SL relay discovery message transmission resource.

At least one of the SL relay discovery message transmission gap assistance information, the SL relay discovery message reception gap assistance information, or the SL relay discovery message transmission assistance information, which is transmitted by the UE to the BS, may be transmitted through the same message or through a different message. When the UE determines that the function of receiving the SL relay discovery message is configured, in operation 1005, the UE may transmit the SL relay discovery message reception gap assistance information to the BS. In operation 1007, the UE may obtain, from the BS, at least one of an SL relay discovery message transmission gap configuration, a SL relay discovery message reception gap configuration, or a configured grant configuration available to transmit the SL relay discovery message. The UE may receive, from the BS, at least one of SL relay discovery message transmission gap information, SL relay discovery message reception gap information, or the configured grant configuration available to transmit the SL relay discovery message, through the same message or through a different message.

According to an embodiment of the disclosure, a UE that is not in an RRC connected state may perform an RRC connection establishment procedure, in order to receive allocation of a resource on which the SL relay discovery message is to be transmitted and/or received, and/or to receive transmission/reception configuration information from the BS. In this case, the UE may determine whether the UE is authenticated to operate as an SL relay UE or to operate as an SL remote UE. The UE may determine whether a condition for the UE to operate as the SL relay UE or a condition for the UE to operate as the SL remote UE is satisfied. Although the UE camps on a frequency capable of transmitting the SL relay discovery message, the UE may determine whether a camped-on cell does not provide an SL relay discovery message transmission resource pool. When at least one of the above conditions is satisfied, the UE may initiate the RRC connection establishment procedure as shown in [Table 5] below.

TABLE 5

For NR sidelink relay, an RRC connection is initiated in the following case:
If configured by upper layers to transmit NR SL relay discovery message:
If the UE is acting as SL relay UE and if the SL relay UE threshold conditions are met; or
If the UE is selecting a SL relay UE/has a selected SL relay UE and if the SL remote UE threshold conditions are met:
If the frequency on which the UE is configured to transmit NR SL relay discovery message concerns the camped frequency and SIB_SL relay of the cell on which the UE camps does not include SL discovery TX pool According to various embodiments of the disclosure, for an NR SL relay, an RRC connection is initiated in the following cases.
(1) A case where the UE is configured by upper layers to transmit an NR SL relay discovery message: a case where the UE operates as an SL relay UE and threshold conditions of the SL relay UE are satisfied, or
(2) A case where the UE is selecting an SL relay UE or has a selected SL relay UE and threshold conditions of the SL remote UE are satisfied: a case where a frequency at which the UE is configured to transmit an NR SL relay discovery message is a camped frequency and a system information block (SIB)_SL relay (an SIB message for the purpose of an SL relay) of a cell on which the UE camps does not include an SL discovery message transmission pool.

According to an embodiment of the disclosure, when the UE is an SL relay UE or an SL remote UE, the UE may transmit assistance information to the BS, in order to receive configuration information (at least one of an SL relay discovery message transmission resource configuration, an SL relay discovery message reception resource configuration, an SL relay discovery transmission gap configuration, or an SL relay discovery message reception gap configuration) necessary for the UE to perform an SL relay discovery operation with respect to the BS. The assistance information transmitted by the UE to the BS may include at least one of pieces of information listed in [Table 6], based on [Table 6] below.

TABLE 6

SL relay UE or SL remote UE
To indicate SL relay discovery transmission resource request
To indicate it no longer requires SL relay discovery transmission resource
To indicate its interest in SL relay discovery reception TABLE 6-continued To indicate it no longer interested in SL relay discovery reception
To request gaps to monitor SL relay discovery
To request gaps to transmit SL relay discovery
To indicate it no longer requires SL discovery gaps (TX gap or RX gap)
Include ue-Type as relay UE or remote UE
To indicate SL relay discovery transmission resource request
Include SL discovery TX type set to true
To indicate its interest in SL relay discovery reception
Include SL discovery RX type set to true According to various embodiments of the disclosure, for an SL relay UE or an SL remote UE, the assistance information may include a UE type as a relay UE or a remote UE, in order to indicate an SL relay discovery transmission resource request, to indicate that an SL relay discovery transmission resource is no longer required, to indicate interest in SL relay discovery reception, to indicate that there is no longer interest in SL relay discovery reception, to request gaps to monitor SL relay discovery, to request gaps for transmitting SL relay discovery, or to indicate that SL discovery gaps (transmission gaps or reception gaps) are no longer required.

According to various embodiments of the disclosure, for the SL relay UE or the SL remote UE, in order to indicate an SL relay discovery transmission resource request, the assistance information may include an SL discovery transmission type configured to true. According to various embodiments of the disclosure, for the SL relay UE or the SL remote UE, in order to indicate interest in SL relay discovery reception, the assistance information may include an SL discovery reception type configured to true.

When the UE is configured to provide the BS with assistance information for transmission of the SL relay discovery message, an embodiment of an operation in which the UE transmits the assistance information for transmission of the SL relay discovery message to the BS is shown in [Table 7] below.

TABLE 7

If configured by upper layer to transmit NR SL relay discovery:
If the UE did not transmit a SUI (SidelinkUEInformation) since entering
RRC_CONNECTED or
If since the last time the UE transmitted a SUI (SidelinkUEInformation) the UE
connected to a Pcell not broadcasting SIB_SL relay (system information block for sidelink
relay operation) or
If the last transmission of SUI (SidelinkUEInformation) did not include TX
resource request for SL relay or if the information carried for SL relay TX resource request
has changed since the last transmission of the SUI (SidelinkUEInformation) If the UE is
acting as SL relay UE or If the UE is selecting a SL Relay UE/has a selected SL Relay
LTE and if the SL remote UE threshold conditions are met
Initiate transmission of SUI (SidelinkUEInformation) to indicate the SL relay
discovery transmission resource request
Else
If the last transmission of the SUI (SidelinkUEInformation) included TX resource
request for SL relay
Initiate transmission of SUI (SidelinkUEInformation) to indicate it no longer
requires SL relay discovery transmission resource
The following corresponds to a condition in which the UE that has performed handover
from a serving cell to a target cell may transmit assistance information for
transmitting/receiving the SL relay discovery message to a target cell BS, when the UE is
authenticated to operate as a relay UE or a remote UE.
If SIB_SL relay (system information block for sidelink relay operation) is
broadcast by the target Pcell and the UE transmitted a SUI (SidelinkUEInformation)
indicating a change of NR SL relay discovery related parameters relevant in target Pcell
(i.e., change of sidelink relay discovery RX interest, sidelink relay discovery TX resource
request, sidelink relay discovery RX gap request, sidelink relay discovery TX gap request
if gapRequestsAllowed is set to true (either dedicated or common)) during the last 1 sec
preceding reception of RRCReconfiguration including mobility with synch In various embodiments of the disclosure, when the UE is configured to transmit NR SL relay discovery by an upper layer as shown in [Table 8].

TABLE 8

When the UE has not transmitted SUI since the UE entered RRC_CONNECTED, the UE has been connected to a primary cell (Pcell) not broadcasting a system information block for SL relay operation (SIB_SL relay) since the last time the UE transmitted the SUI, the last transmission of the SUI did not include a transmission resource request for SL relay, information transmitted for the SL relay transmission resource request has changed since the last transmission of the SUI, the UE operates as an SL relay UE, or the UE is a selected SL relay UE and SL remote UE threshold conditions are satisfied, transmission of the SUI is initiated to indicate the SL relay discovery transmission resource request.
Else:
When the last transmission of the SUI included a transmission resource request for SL relay, transmission of the SUI is initiated to indicate that the SL relay discovery transmission resource is no longer required.

If it is determined that the SIB_SL relay is broadcast by a target Pcell and the UE initiated transmission of a SUI message including a change of NR SL relay discovery information supported by the target Pcell (when the UE initiated transmission of the SUI message including changed information while staying in a serving Pcell) during the last 1 second prior to reception of RRCReconfiguration including a handover indication to the target Pcell, the UE may initiate transmission of the SUI from a BS of the target Pcell. That is, the UE may have transmitted a SUI message to transmit information related to SL relay discovery to the BS of the target Pcell through a BS of the serving Pcell prior to handover to the BS of the target Pcell.

The UE may determine a change of the information related to SL relay discovery near a time point at which the UE performs handover to the BS of the target Pcell (if gapRequestsAllowed is configured to true (either dedicated or common), a change of interest in SL relay discovery reception, an SL relay discovery transmission resource request, and SL relay discovery transmission gap request). When transmission of SUI including changed information is initiated, the corresponding information may not be transmitted from the BS of the serving Pcell to the BS of the target Pcell as information related to SL relay discovery of the UE. Accordingly, in order to transmit latest information related to SL relay discovery of the UE to the BS of the target Pcell, the UE may initiate transmission of the SUI message from the BS of the target Pcell when the above conditions are satisfied.

Hereinafter, configurations of transmission resource information and reception resource information about an SL relay discovery message, according to an embodiment of the disclosure, are described. In an embodiment of the disclosure, the transmission resource and the reception resource for the SL relay discovery message may be configured in the same transmission resource pool or the same reception resource pool as a transmission resource and a reception resource defined for the purpose of a general SL message. In an embodiment of the disclosure, configuring or releasing the transmission resource and/or the reception resource for the SL relay discovery message may refer to setting up or releasing sl-PDSCH-Config. In an embodiment of the disclosure, sl-PDSCH-Config may be as shown in [Table 9] below.

TABLE 9

```
SL-ResourcePool-r16 ::=      SEQUENCE {
    sl-PSCCH-Config-r16    SetupRelease { SL-PSCCH-Config-r16 }    OPTIONAL,       -- Need M
    sl-PSSCH-Config-r16    SetupRelease { SL-PSSCH-Config-r16 }    OPTIONAL,       -- Need M
    sl-PSFCH-Config-r16    SetupRelease { SL-PSFCH-Config-r16 }    OPTIONAL,       -- Need M
    sl-PDSCH-Config        SetupRelease { SL-PDSCH-Config}         OPTIONAL,  -- Need M
        sl-SyncAllowed-r16        SL-SyncAllowed-r16   OPTIONAL, -- Need M
        sl-SubchannelSize-r16   ENUMERATED {n10, n12, n15, n20, n25, n50, n75, n100} OPTIONAL,    --
Need M
        dummy            INTEGER (10..160) OPTIONAL,    -- Need M
        sl-StartRB-Subchannel-r16 INTEGER (0..265) OPTIONAL,    -- Need M
        sl-NumSubchannel-r16    INTEGER (1..27) OPTIONAL,    -- Need M
        sl-Additiorial-MCS-Table-r16 ENUMERATED {qam256, qam64LowSE, qam256-qam64LowSE }
OPTIONAL,    -- Need M
        sl-ThreshS-RSSI-CBR-r16     INTEGER. (0..45) OPTIONAL, -- Need M
        sl-TimeWindowSizeCBR-r16     ENUMERATED {ms100, slot100} OPTIONAL, -- Need M
        sl-TimeWindowSizeCR-r16     ENUMERATED {ms1000, slot1000} OPTIONAL, -- Need M
        sl-PTRS-Config-r16      SL-PTRS-Config-r16    OPTIONAL,       -- Need M
        sl-UE-SelectedConfigRP-r16    SL-UE-SelectedConfigRP-r16    OPTIONAL,    -- Need M
        sl-RxParametersNcell-r16        SEQUENCE {
            sl-TDD-Configuration-r16 TDD-UL-DL-ConfigCommom    OPTIONAL,    -- Need M
            sl-SyncConfigIndex-r16 INTEGER. (0..15)
        } OPTIONAL,    -- Need M
        sl-ZoneConfigMCR-List-r16 SEQUENCE (SIZE (16)) OF SL-ZoneConfigMCR-r16    OPTIONAL,    --
Need M
        sl-FilterCoefficient-r16    FilterCoefficient    OPTIONAL,    -- Need M
        sl-RB-Number-r16            INTEGER (10..275) OPTIONAL,    -- Need M
        sl-PreemptionEnable-r16 ENUMERATED {enabled, pl1, pl2, pl3, pl4, pl5, pl6, pl7, pl8}
OPTIONAL, -- Need R
        sl-PriorityThreshold-UL-URLLC-r16    INTEGER (1..9) OPTIONAL,    -- Need M
        sl-PriorityThreshold-r16      INTEGER (1..9) OPTIONAL,    -- Need M
```

TABLE 9-continued

```
    sl-X-Overhead-r16           ENUMERATED {n0,n3, n6, n9}   OPTIONAL,   --Need S
    sl-PowerControl-r16         SL-PowerControl-r16   OPTIONAL,   -- Need M
    sl-TxPercentageList-r16     SL-TxPercentageList-r16   OPTIONAL,   -- Need M
    sl-MinMaxMCS-List-r16       SL-MinMaxMCS-List-r16   OPTIONAL,   -- Need M
    ...,
    [[
    sl-TimeResource-r16   BIT STRING (SIZE (10..160)) OPTIONAL   -- Need M
    ]]
}
SL-PSCCH-Config-r16 ::=       SEQUENCE {
    sl-TimeResourcePSCCH-r16   ENUMERATED {n2, n3} OPTIONAL,   --Need M
    sl-FreqResourcePSCCH-r16 ENUMERATED {n10,n12, n15, n20, n25} OPTIONAL,   -- Need M
    sl-DMRS-Scramble-ID-r16   INTEGER (0..65535) OPTIONAL,   -- Need M
    sl-NumReservedBits-r16   INTEGER (2..4) OPTIONAL,   -- Need M
  ...
}
SL-PSCCH-Config-r16 ::=       SEQUENCE {
    sl-PSSCH-DMRS-TimePatternList-r16   SEQUENCE (SIZE (1,.3)) OF INTEGER (2..4) OPTIONAL,
-- Need M
    sl-BetaOffsets2ndSCI-r16 SEQUENCE (SIZE (4)) OF SL-BetaOffsets-r16 OPTIONAL,   -- Need M
    sl-Scaling-r16 ENUMER.A LED {f0p5, f0p65, f0p8, f1} OPTIONAL,   -- Need M
  ...
}
Sl-PDSCH-Config :: =    SEQUENCE [
    sl-Discovery-Period ENUMERATED {d0, d1, d2, d3, ...}   OPTIONAL,   -- Need M // Indicates the
period of PDSCH resource in the unit of slots within this resource pool
    sl-RBResourcePDSCH          ENUMERATED {n0,n1,n2,n3,...}   OPTIONAL,   --Need M//
Indicates the number of PRBs for PDSCH in a resource pool
    sl-PowerControl-Discovery    SL-PowerControl-Discovery OPTIONAL,    -- Need M // e.g., Max value
of SL discovery transmission power, alpha value for sidelink path loss based power conrol for SL discovery
PSDCH(PSCCH/PSSCH), P0 value for sidelink pathloss based power control for SL discovery
PSDCH(PSCCH/PSSCH), alpha value for downlink path loss based power control for SL discovery
PSDCH(PSCCH/PSSCH), P0 value for downlink path loss based power control for SL discovery
PSDCH(PSCCH/PSSCH)
    sl-MinMaxMCS-List-Discovery       SL-MinMaxMCS-List-Discovery   OPTIONAL,   -- Need M //
e.g., maximum MCS value for SL discovery, minimum MCS value for SL discovery
        sl-PSCCH-Config-Discovery SL-PSCCH-Config-r16 OPTIONAL,
        sl-PSSCH-Config-Discovery SL-PSSCH-Config-r16 OPTIONAL,
}
...
}
```

The sl-PDSCH-Config may include at least one of a period of a resource configured in an SL relay discovery message in a corresponding transmission resource pool or a corresponding reception resource pool (i.e., the number of slots (sl-Discovery-Period) in which the SL relay discovery message is transmitted in the corresponding transmission resource pool or the corresponding reception resource pool), the number of physical resource blocks (PRBs) (sl-RBResourcePDSCH) configured in the SL relay discovery message in the corresponding transmission resource pool or the corresponding reception resource pool, or TX parameters (transmission power control and MCS control) to be applied to the SL relay discovery message.

Configuration information about the transmission resource and configuration information about the reception resource for the SL relay discovery message (i.e., sl-PDSCH-Config) may include configuration information about a physical sidelink control channel (PSCCH) and a physical sidelink shared channel (PSSCH) corresponding to the SL relay discovery message. Configuration information about the PSCCH corresponding to the SL relay discovery message may be the same as or different from, e.g., configuration information about a PSCCH configured for the purpose of the general SL message. Configuration information about the PSSCH corresponding to the SL relay discovery message may be the same as or different from, e.g., configuration information about a PSSCH configured for the purpose of the general SL message.

According to an embodiment of the disclosure, in sl-PSDCH-Config indicating a transmission resource configuration and a reception resource configuration of the SL relay discovery message, some of TX parameters (transmission power control and MCS control), time resources (e.g., the number of slots or sl-Discovery-Period) for the purpose of transmitting and/or receiving the SL relay discovery message, and frequency resources (e.g., the number of PRBs or sl-RBResourcePDSCH) for the purpose of transmitting and/or receiving the SL relay discovery message may be configured, and others may not be configured. In this case, the UE that transmits or receives the SL relay discovery message may determine that information applied to a PSCCH configuration or a PSSCH configuration of a resource pool may be equally applied to a PSCCH or a PSSCH corresponding to transmission and/or reception of the SL relay discovery message.

When the UE is configured to measure a reference signal received power (RSRP) of the SL relay discovery message, the UE that receives the SL relay discovery message may measure the RSRP by using the configuration information (sl-PDSCH-Config) about the transmission and reception resources for the SL relay discovery message. The UE may obtain, by using the configuration information, at least one information among location information about a resource on which the SL relay discovery message is received, SCI (PSCCH and PSSCH) corresponding to the SL relay discovery message, or the PSSCH corresponding to the SL relay discovery message. The UE may perform, based on the obtained information, RSRP measurement on at least one of the SCI (PSCCH and PSSCH) corresponding to the SL relay discovery message whose RSRP is configured to be measured, or the PSSCH corresponding to the SL relay discovery message.

According to an embodiment of the disclosure, the SCI (PSCCH and PSSCH) corresponding to the SL relay discovery message may include indication information indicating transmission of the SL relay discovery message to be identifiable from transmission of the general SL message. According to another embodiment of the disclosure, the SCI (PSCCH and PSSCH) corresponding to the SL relay discovery message may not include indication information indicating transmission of the SL relay discovery message.

According to another embodiment of the disclosure, the transmission resource and/or the reception resource for the SL relay discovery message may be configured in the same transmission resource pool or the same reception resource pool as a transmission resource and/or a reception resource defined for the purpose of the general SL message. In this case, configurations of the transmission resource and/or the reception resource for the SL relay discovery message may be defined by the sl-PSDCH-Config. In this regard, a method by which the transmission resource and/or the reception resource of the SL relay discovery message is configured by setting up and/or releasing the sl-PDSCH-Config may be applied. The UE may be configured to measure an RSRP of the SL relay discovery message. In this case, the UE may determine whether a message is the SL relay discovery message, by using at least one of a source identifier, a destination identifier, or an SL LCH identifier of an SL MAC PDU received from a resource of the sl-PSDCH-Config.

In an embodiment of the disclosure, when it is determined that the message is the SL relay discovery message, the UE may determine at least one information among SCI (PSCCH and PSSCH) corresponding to the SL relay discovery message or a PSSCH corresponding to the SL relay discovery message. The UE may perform RSRP measurement on at least one of the SCI (PSCCH and PSSCH) corresponding to the SL relay discovery message whose RSRP is configured to be measured, or the PSSCH corresponding to the SL relay discovery message.

According to another embodiment of the disclosure, the transmission resource and/or the reception resource for the SL relay discovery message may be configured in the same transmission resource pool or the same reception resource pool as a transmission resource and/or a reception resource defined for the purpose of the general SL message. In this case, configurations of the transmission resource and/or the reception resource for the SL relay discovery message may not be separately defined by the sl-PSDCH-Config. In this regard, a method by which the transmission resource and/or the reception resource for the SL relay discovery message is configured by setting up and/or releasing at least one of sl-PSCCH-Config or sl-PSSCH-Config. The UE needs to identify whether at least one of the sl-PSCCH-Config or the sl-PSSCH-Config corresponds to the transmission resource and/or the reception resource for the SL relay discovery message or corresponds to a transmission resource and/or a reception resource for the general SL message. This is intended to support a case where the UE is configured to measure an RSRP of the SL relay discovery message.

For example, the sl-PSCCH-Config and the sl-PSSCH-Config may be configured to include indication information for the transmission resource and/or the reception resource for the SL relay discovery message. For example, the transmission UE may transmit the SL relay discovery message by using resources of the sl-PSCCH-Config and the sl-PSSCH-Config. In this case, the sl-PSCCH-Config and the sl-PSSCH-Config may include indication information indicating transmission of the SL relay discovery message so that the transmission of the SL relay discovery message is identifiable from transmission of the general SL message. As an embodiment of the disclosure, the UE that receives the SL relay discovery message may measure the RSRP based on indication information for configuration information (sl-PSCCH-Config and sl-PSSCH-Config) about the transmission resource and/or the reception resource for the SL relay discovery message.

The UE may obtain, based on the indication information, at least one information among location information about a resource on which the SL relay discovery message is received, SCI (PSCCH and PSSCH) corresponding to the SL relay discovery message, or a PSSCH corresponding to the SL relay discovery message. The UE may perform, based on the obtained information, RSRP measurement on at least one of the SCI (PSCCH and PSSCH) corresponding to the SL relay discovery message whose RSRP is configured to be measured, or the PSSCH corresponding to the SL relay discovery message.

According to another embodiment of the disclosure, a method by which configurations of the transmission resource and/or the reception resource for the SL relay discovery message are not separately defined by the sl-PSDCH-Config and the transmission resource and/or the reception resource for the SL relay discovery message is configured by setting up and/or releasing at least one of corresponding sl-PSCCH-Config or sl-PSSCH-Config. In this case, the transmission UE may transmit the SL relay discovery message by using resources of the sl-PSCCH-Config and the sl-PSSCH-Config. Also, in this case, the SCI (PSCCH and PSSCH) may include indication information indicating transmission of the SL relay discovery message so that the transmission of the SL relay discovery message is identifiable from transmission of the general SL message.

The UE that receives the SL relay discovery message may determine that a message is the SL relay discovery message, from SCI (PSCCH and PSSCH) corresponding to an SL relay discovery message transmitted through configuration information (sl-PSCCH-Config and sl-PSSCH-Config) about the transmission resource and/or the reception resource for the SL relay discovery message. The UE may perform RSRP measurement on at least one of the SCI (PSCCH and PSSCH) corresponding to the SL relay discovery message whose RSRP is configured to be measured, or the PSSCH corresponding to the SL relay discovery message.

According to another embodiment of the disclosure, the transmission resource and/or the reception resource for the SL relay discovery message may be configured in the same transmission resource pool or the same reception resource pool as a transmission resource and/or a reception resource defined for the purpose of the general SL message. In this case, configurations of the transmission resource and/or the reception resource for the SL relay discovery message may not be separately defined by the sl-PSDCH-Config. In this regard, a method by which the transmission resource and/or the reception resource for the SL relay discovery message is configured by setting up and/or releasing at least one of corresponding sl-PSCCH-Config or sl-PSSCH-Config.

In an embodiment of the disclosure, the UE may be configured to measure an RSRP of the SL relay discovery message. In this case, the UE may determine whether a message is the SL relay discovery message, by using at least one of a source identifier, a destination identifier, or an SL LCH identifier of an SL MAC PDU received from resources of the sl-PSCCH-Config and the sl-PSSCH-Config. In an embodiment of the disclosure, when it is determined that the message is the SL relay discovery message, the UE may determine at least one information among the SCI (PSCCH and PSSCH) corresponding to the SL relay discovery message or the PSSCH corresponding to the SL relay discovery message. The UE may perform RSRP measurement on at least one of the SCI (PSCCH and PSSCH) corresponding to the SL relay discovery message whose RSRP is configured to be measured, or the PSSCH corresponding to the SL relay discovery message.

A resource pool for the purpose of transmitting the SL relay discovery message may be configured to be the same as a transmission resource pool configured to transmit the general SL message (i.e., configured as a shared resource pool) or may be configured separately from a transmission resource pool configured to transmit the general SL message (i.e., configured as a dedicated resource pool). For the shared resource pool and/or the dedicated resource pool, there is a need for a method for which transmission resource pool to select when the BS schedules an SL relay discovery message transmission resource and when the UE directly selects a transmission resource.

As an embodiment of the disclosure, when the resource pool for the purpose of transmitting the SL relay discovery message is configured as both the shared resource pool and the separately configured dedicated resource pool, the shared resource pool being configured to be the same as the transmission resource pool configured to transmit the general SL message, the BS and the UE may select a separately configured resource pool (i.e., the dedicated resource pool) to transmit the SL relay discovery message regardless of a shared resource pool configuration, and may select a transmission resource from the selected pool. When more than one dedicated resource pool is separately configured, a pool having a lowest congestion level may be selected by comparing congestion levels (e.g., congestion levels according to a channel busy ratio (CBR)) of the dedicated resource pools, or an arbitrary pool may be selected.

As another embodiment of the disclosure, when the resource pool for the purpose of transmitting the SL relay discovery message is configured as both the shared resource pool configured to be the same as the transmission resource pool that is configured to transmit the general SL message, and the separately configured dedicated resource pool, in a case where the BS schedules the SL relay discovery message transmission resource, the BS may arbitrarily select one of the shared resource pool or the dedicated resource pool and allocate a transmission resource from the selected pool. Alternatively, the BS may select a pool having a lowest congestion level by comparing congestion levels of the shared resource pool and the dedicated resource pool.

As another embodiment of the disclosure, when the resource pool for the purpose of transmitting the SL relay discovery message is configured as both the shared resource pool configured to be the same as the transmission resource pool that is configured to transmit the general SL message, and the separately configured dedicated resource pool, in a case where the UE directly selects the SL relay discovery message transmission resource, the UE may select the dedicated resource pool to transmit the SL relay discovery message regardless of the shared resource pool configuration, and may select a transmission resource from the corresponding pool. When there is more than one dedicated resource pool, a pool having a lowest congestion level may be selected by comparing congestion levels (i.e., congestion levels according to the CBR) of the dedicated resource pools, or an arbitrary pool may be selected.

As another embodiment of the disclosure, when the UE directly selects the SL relay discovery message transmission resource, in a case where the discovery message and the shared resource pool are configured together, when a congestion level (i.e., a congestion level according to the CBR) of the dedicated resource pool is not higher than a threshold (e.g., a congestion level threshold) (assuming that the pool is not congested when the congestion level is not higher than the threshold), the UE may select the dedicated resource pool and select a transmission resource from the corresponding pool. When it is determined that the congestion level of the dedicated resource pool is higher than the threshold, the UE may select the shared resource pool and select a transmission resource from the corresponding pool. In this case, when there are one or more dedicated resource pools, the UE may compare a congestion level of a dedicated resource pool having a smallest congestion level value with the threshold. This is intended to ensure that the dedicated resource pool is used in preference to the shared resource pool for the purpose of transmitting the SL relay discovery message.

Alternatively, when a congestion level of the shared resource pool is not higher than the threshold, the UE may select the shared resource pool and select a transmission resource from the corresponding pool. When it is determined that the congestion level of the shared resource pool is higher than the threshold, the UE may select the dedicated resource pool and select a transmission resource from the corresponding pool. In this case, when there are one or more shared resource pools, the UE may compare a congestion level of a shared resource pool having a smallest congestion level value with the threshold. This is to ensure that the shared resource pool is used in preference to the dedicated resource pool for the purpose of transmitting the SL relay discovery message. The threshold value for selecting the dedicated resource pool or the shared resource pool may be configured in the UE by the BS or may be pre-configured in the UE.

As another embodiment of the disclosure, when the UE directly selects the SL relay discovery message transmission resource, in a case where the dedicated resource pool and the shared resource pool are configured together, the UE may compare a congestion level of the dedicated resource pool and a congestion level of the shared resource pool. The UE may select a pool whose congestion level value is not large, as a result of the comparison (assuming that the pool is not congested when the congestion level value is not large), and may select a resource from the corresponding pool. In this case, when there are one or more dedicated resource pools, the UE may select a pool having a smallest congestion level value from among the dedicated resource pools (assuming that the pool is less congested as the congestion level value is smaller). When there are one or more shared resource pools, the UE may select a pool having a smallest congestion level value from among the shared resource pools (assuming that the pool is less congested as the congestion level value is smaller).

As another embodiment of the disclosure, when the UE directly selects the SL relay discovery message transmission resource, in a case where the dedicated resource pool and the shared resource pool are configured together, the UE may select an arbitrary pool from among the dedicated resource pool and the shared resource pool, and may select a transmission resource from the corresponding pool.

The BS may configure a mode 1 (i.e., a mode in which the BS schedules a transmission resource) or a mode 2 (i.e., a mode in which the UE directly selects a transmission resource) as an SL transmission resource allocation mode for a relay UE. When a mode is configured to the mode 1, the BS may configure the relay UE to use at least one or a combination of a dynamic grant scheme, a configured grant type 1 scheme (a scheme in which transmission resource scheduling information is transmitted through RRC signaling), or a configured grant type 2 scheme (a scheme in which transmission resource scheduling information is transmitted through RRC signaling and DCI). The BS may configure a mode 2 (a mode in which the UE directly selects a transmission resource) or a mode 1 (a mode in which the BS schedules a transmission resource) as an SL transmission resource allocation mode for a remote UE.

When a mode is configured to the mode 1, the BS may configure the remote UE to use the configured grant type 1 scheme (the scheme in which transmission resource scheduling information is transmitted through RRC signaling). That is, the BS may not configure the remote UE to use the dynamic grant scheme or the configured grant type 2 scheme that requires an operation of monitoring and decoding DCI from the BS, but may configure the remote UE to use the configured grant type 1 scheme capable of obtaining scheduling information from the BS through RRC signaling of the BS, which is relayed and transmitted through the relay UE.

In general SL direct communication, when the UE directly selects/reselects a transmission resource, the UE may determine which time/frequency resource to select/reselect as a transmission resource of a packet in consideration of packet delay budget requirements applied to a packet to be transmitted. The packet delay budget requirements applied to the packet may be determined according to QoS requirements and QoS profiles of a higher service to which the packet belongs. A MAC layer processor responsible for a function of selecting/reselecting a transmission resource of the UE may obtain packet delay budget information about the corresponding packet from a higher layer. The MAC layer processor may transmit packet delay budget related information (e.g., remaining packet delay budget information) to a PHY layer processor responsible for a function of selecting/reselecting a transmission resource. The MAC layer processor and the PHY layer processor of the UE may perform an operation of sensing and selecting a resource based on the packet delay budget related information (e.g., the remaining packet delay budget information) or an operation of arbitrarily selecting a resource.

In the case of an SL discovery message (e.g., an SL relay discovery message and an SL direct discovery message), unlike general SL data, service related QoS parameters or QoS profiles may not be defined for the SL discovery message. In this case, the packet delay budget information may not be transmitted from a service layer of the UE to a MAC layer of the UE. According to an embodiment of the disclosure, the UE may directly select/reselect a transmission resource on which an SL discovery message (e.g., an SL relay discovery message and an SL direct discovery message) is to be transmitted, from a transmission resource pool configured for SL discovery. In this case, as in a case where a general SL message transmission resource is selected/reselected, a packet delay budget may be defined for the purpose of an SL discovery message, and the UE may perform an operation of sensing and selecting a resource based on the packet delay budget defined for the purpose of the SL discovery message or an operation of arbitrarily selecting a resource.

That is, the MAC layer and the PHY layer of the UE may perform an operation of sensing and selecting an SL discovery message transmission resource based on packet delay budget related information (e.g., remaining packet delay budget information) or an operation of arbitrarily selecting an SL discovery message transmission resource. In this case, it may be necessary to configure packet delay budget parameters to be applied by the UE in the SL discovery message. In an embodiment of the disclosure, the UE may arbitrarily configure, in the UE, packet delay budget parameters to be applied in selection/reselection of the SL discovery message transmission resource.

In an embodiment of the disclosure, packet delay budget parameters to be applied by the UE in selection/reselection of the SL discovery message transmission resource may be configured through signaling transmitted by the BS to the UE. In an embodiment of the disclosure, packet delay budget parameters to be applied by the UE in selection/reselection of the SL discovery message transmission resource may be pre-configured in the UE. An example of configuring packet delay budget for the SL discovery message is shown as an option 1 or an option 2 in [Table 10] below.

TABLE 10

(option 1) sl-LatencyBoundDiscovery
Indicate the latency bound of SL discovery in terms of number of slots or in unit of msec.
(option 2) sl-PacketDelayBudgetDiscovery
Indicate the packet delay budget for a SL discovery in terms of number of slots or in unit of msec.

According to another embodiment of the disclosure, when the UE selects/reselects a transmission resource on which the SL discovery message is to be transmitted, the UE may not consider the packet delay budget requirements for the SL discovery message. The MAC layer of the UE may transmit, to the PHY layer of the UE, information excluding the packet delay budget information (e.g., remaining packet delay budget information) among pieces of information (e.g., information listed in [Table 11]) related to selection/reselection of a resource. The MAC layer and the PHY layer of the UE may determine a transmission resource to be selected/reselected for the purpose of the SL discovery message without considering the packet delay budget related information (e.g., remaining packet delay budget information) for the SL discovery message, i.e., regardless of whether a remaining packet delay budget is satisfied.

For example, information transmitted by the MAC layer to the PHY layer of the UE when the UE selects/reselects a general SL data transmission resource may include information listed in [Table 11] below.

TABLE 11 the resource pool from which the resources are to be reported;
L1 priority, $\text{prio}_{TX}$;
the remaining packet delay budget:
the number of sub-channels to be used for the PSSCH/PSCCH (e.g., resources for sidelink direct communication or resources for sidelink discovery) transmission in a slot, $L_{subCH}$;
optionally, the resource reservation interval, $P_{rsvp\_TX}$, in units of msec.
if the higher layer requests the UE to determine a subset of resources from which the higher layer will select resources for PSSCH/PSCCH (e.g., resources for sidelink direct communication or resources for sidelink discovery) transmission as part of re-evaluation or pre-emption procedure, the higher layer provides a set of resources ($r_0, r_1, r_2, \ldots$) which may be subject to re-evaluation and a set of resources ($r'_0, r'_1, r'_2, \ldots$) which may be subject to pre-emption.
it is up to UE implementation to determine the subset of resources as requested by higher layers before or after the slot $r_i''$-$T_3$, where $r_i''$ is the slot with the smallest slot index among ($r_0, r_1, r_2, \ldots$) and ($r'_0, r'_1, r'_2, \ldots$), and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

When the MAC layer of the UE identifies the packet delay budget parameters configured for the SL discovery message, the UE may transmit, to the PHY layer of the UE, the information listed in [Table 11] including the remaining packet delay budget. When the MAC layer of the UE does not identify the packet delay budget parameters for the SL discovery message, the UE may transmit, to the PHY layer, the information listed in [Table 11] excluding the remaining packet delay budget.

The methods according to embodiments as described in the specification or in the following claims of the disclosure may be implemented as hardware, software, or a combination of hardware and software.

When the methods are implemented in software, a computer-readable recording medium having one or more programs (software modules) stored therein may be provided. One or more programs stored in the computer-readable storage medium are configured to be executable by one or more processors in an electronic device. The one or more programs include instructions for causing the electronic device to execute the methods according to the embodiments of the disclosure described in the claims or the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, a magnetic cassette, or memory including any combination of some or all thereof. Also, each constituent memory may include a plurality of memories.

Also, the programs may be stored in an attachable storage device which is accessible through a communication network such as the Internet, an intranet, a local area network (LAN), a wireless LAN (WLAN), or a storage area network (SAN), or a combination thereof. Such a storage device may access, through an external port, an apparatus performing the embodiments of the disclosure. Furthermore, a separate storage device on the communication network may access the apparatus performing the embodiments of the disclosure.

According to embodiments of the disclosure, a service may be efficiently provided to a user in a wireless communication system, and service coverage may be extended.

The effects obtainable in the disclosure are not limited to the aforementioned effects, and other effects not mentioned may be clearly understood by one of ordinary skill in the art from the description below.

In the aforementioned embodiments of the disclosure, components included in the disclosure are expressed in a singular or plural form according to the embodiments of the disclosure. However, the singular or plural form is appropriately selected for convenience of descriptions and the disclosure is not limited thereto. As such, a component expressed in a plural form may also be configured as a single component, and a component expressed in a singular form may also be configured as plural components.

Although specific embodiments have been described in the detailed description of the disclosure, various modifications may be made without departing from the scope of the disclosure. Therefore, the scope of the disclosure should not be limited to the aforementioned embodiments of the disclosure and should be determined by the appended claims and the equivalents thereof.

What is claimed is:

1. A method, performed by a relay user equipment (UE) in a wireless communication system, the method comprising:
    obtaining configuration information including sidelink configuration information, wherein the sidelink configuration information includes a sidelink resource pool;
    identifying whether the sidelink configuration information includes a dedicated resource pool for a sidelink discovery message,
    in case that the sidelink configuration information includes the dedicated resource pool for the sidelink discovery message, selecting the dedicated resource pool for the sidelink discovery message as a resource pool for the sidelink discovery message;
    in case that the sidelink configuration information does not include the dedicated resource pool for the sidelink discovery message, selecting the sidelink resource pool as the resource pool for the sidelink discovery message; and
    transmitting, to a remote UE, the sidelink discovery message based on the resource pool for the sidelink discovery message.

2. The method of claim 1, further comprising:
    receiving, from the remote UE, sidelink discovery based on the resource pool for the sidelink discovery message.

3. The method of claim 2, wherein receiving the sidelink discovery comprises:
    receiving, from a base station (BS), a system information block;

selecting the dedicated resource pool for the sidelink discovery message as the resource pool for the sidelink discovery message based on the system information block; and receiving, from the remote UE, the sidelink discovery based on the resource pool for the sidelink discovery message.

4. The method of claim 1, further comprising:

transmitting, to a base station (BS), a message requesting the configuration information.

5. The method of claim 3, further comprising:

in case that a frequency configured to transmit the sidelink discovery message is a camped frequency and the system information block does not include information associated with the resource pool, performing a RRC connection establishment procedure.

6. The method of claim 1, wherein selecting the dedicated resource pool for the sidelink discovery message as the resource pool for the sidelink discovery message comprises:

selecting the dedicated resource pool for the sidelink discovery message as the resource pool for the sidelink discovery message based on scheduling information received from a base station (BS).

7. The method of claim 1, wherein selecting the dedicated resource pool for the sidelink discovery message as the resource pool for the sidelink discovery message comprises:

selecting the dedicated resource pool for the sidelink discovery message as the resource pool for the sidelink discovery message based on selecting of the relay UE.

8. A relay user equipment (UE) in a wireless communication system, the relay UE comprising:

a transceiver;

memory; and a processor operably coupled with the transceiver and the memory, the processor configured to:

obtain configuration information including sidelink configuration information, wherein the sidelink configuration information includes a sidelink resource pool, identify whether the sidelink configuration information includes a dedicated resource pool for a sidelink discovery message, in case that the sidelink configuration information includes the dedicated resource pool for the sidelink discovery message, select the dedicated resource pool for the sidelink discovery message as a resource pool for the sidelink discovery message;

in case that the sidelink configuration information does not include the dedicated resource pool for the sidelink discovery message, select the sidelink resource pool as the resource pool for the sidelink discovery message; and transmit, to a remote UE, the sidelink discovery message based on the resource pool for the sidelink discovery message.

9. The relay UE of claim 8, wherein the processor is further configured to:

receive, from the remote UE, sidelink discovery based on the resource pool for the sidelink discovery message.

10. The relay UE of claim 9, wherein the processor is further configured to:

receive, from a base station (BS), a system information block;

select the dedicated resource pool for the sidelink discovery message as the resource pool for the sidelink discovery message based on the system information block; and receive, from the remote UE, the sidelink discovery based on the resource pool for the sidelink discovery message.

11. The relay UE of claim 8, wherein the processor is further configured to:

transmit, to a base station (BS), a message requesting the configuration information.

12. The relay UE of claim 10, wherein the processor is further configured to:

in case that a frequency configured to transmit a sidelink relay discovery message is a camped frequency and the system information block does not include information associated with the resource pool, perform an RRC connection establishment procedure.

13. The relay UE of claim 8, wherein the processor is further configured to:

select the dedicated resource pool as the resource pool based on scheduling information received from a base station (BS).

14. The relay UE of claim 8, wherein the processor is further configured to:

select the dedicated resource pool for the sidelink discovery message as the resource pool for the sidelink discovery message based on scheduling information received from a base station (BS).

15. The method of claim 5, further comprising:

in case that the relay UE is configured to transmit the sidelink discovery message, performing a RRC connection establishment procedure for the configuration information including the sidelink configuration information.

16. The relay UE of claim 12, further comprising:

in case that the relay UE is configured to transmit the sidelink discovery message, perform a RRC connection establishment procedure for the configuration information including the sidelink configuration information.

* * * * *